United States Patent
Pilz et al.

(10) Patent No.: US 12,377,585 B2
(45) Date of Patent: Aug. 5, 2025

(54) METHOD FOR PRODUCING AN OPTICAL ELEMENT FROM PLASTIC

(71) Applicant: Docter Optics SE, Neustadt an der Orla (DE)

(72) Inventors: Florian Pilz, Neustadt an der Orla (DE); Sven Fröhlich, Neustadt an der Orla (DE)

(73) Assignee: DOCTER OPTICS SE, Neustadt an der Orla (DE)

( * ) Notice: Subject to any disclaimer, the term of this patent is extended or adjusted under 35 U.S.C. 154(b) by 385 days.

(21) Appl. No.: 17/791,002

(22) PCT Filed: Jan. 13, 2021

(86) PCT No.: PCT/DE2021/100035
§ 371 (c)(1),
(2) Date: Jul. 6, 2022

(87) PCT Pub. No.: WO2021/143981
PCT Pub. Date: Jul. 22, 2021

(65) Prior Publication Data
US 2023/0029379 A1    Jan. 26, 2023

(30) Foreign Application Priority Data

Jan. 15, 2020 (DE) .................. 10 2020 100 888.0
Jun. 25, 2020 (DE) .................. 10 2020 116 793.8

(51) Int. Cl.
*B29C 45/16* (2006.01)
*B29L 11/00* (2006.01)

(52) U.S. Cl.
CPC ...... *B29C 45/1618* (2013.01); *B29C 45/1679* (2013.01); *B29K 2995/0018* (2013.01); *B29L 2011/0016* (2013.01)

(58) Field of Classification Search
CPC .. B29C 45/14; B29C 45/1618; B29C 45/1679
See application file for complete search history.

(56) References Cited

U.S. PATENT DOCUMENTS

| | | |
|---|---|---|
| 821,610 A | 5/1906 | Cox |
| 4,666,496 A | 5/1987 | Fecik |

(Continued)

FOREIGN PATENT DOCUMENTS

| | | |
|---|---|---|
| CN | 205049796 | 2/2016 |
| CN | 105819674 | 8/2016 |

(Continued)

OTHER PUBLICATIONS

International Search Report and Written Opinion Issued Feb. 1, 2022 for Corresponding PCT Application No. PCT/DE2021/100858.

(Continued)

*Primary Examiner* — Edmund H Lee
(74) *Attorney, Agent, or Firm* — Carter, DeLuca & Farrell LLP

(57) ABSTRACT

The disclosure relates to a method for producing an optical element (42, 43) having at least one optically effective surface, wherein, by means of a first injection mold of an injection-molding machine (500, 500') liquid transparent plastic (54, P4014, P4017) is injection-molded to form a preform and/or a pre-molded part (20) having at least one preform (22, 23), the preform or the pre-molded part (20) subsequently being cooled outside the first injection mold and/or outside the injection-molding machine (500, 500'), and the preform (22, 23) to form the optical element subsequently being injection-molded and/or over-molded in a second injection mold by applying at least one layer of plastic, which forms the optically effective surface (42, 43).

19 Claims, 17 Drawing Sheets

(56) References Cited

U.S. PATENT DOCUMENTS

| | | | |
|---|---|---|---|
| 4,756,737 A | 7/1988 | Yoshimura et al. | |
| 5,120,343 A | 6/1992 | Monji et al. | |
| 5,227,917 A | 7/1993 | Kubo et al. | |
| 5,922,369 A * | 7/1999 | Yanagihara | B29D 11/00009 425/572 |
| 6,114,039 A | 9/2000 | Rifqi | |
| 6,130,777 A | 10/2000 | Yamashita et al. | |
| 6,638,450 B2 * | 10/2003 | Richard | B29D 11/0073 264/1.32 |
| 7,798,688 B2 | 9/2010 | Hamkens | |
| 8,998,435 B2 | 4/2015 | Brick | |
| 11,826,935 B2 * | 11/2023 | Wodak | B29C 45/1618 |
| 2001/0033726 A1 | 10/2001 | Shie et al. | |
| 2002/0153624 A1 | 10/2002 | Tumlin et al. | |
| 2003/0001301 A1 | 1/2003 | Duroux et al. | |
| 2004/0244421 A1 | 12/2004 | Kato et al. | |
| 2005/0054514 A1 | 3/2005 | Ishioka et al. | |
| 2006/0072208 A1 | 4/2006 | Bonitz et al. | |
| 2008/0315162 A1 * | 12/2008 | Berzon | C09J 133/14 252/582 |
| 2009/0000336 A1 | 1/2009 | Rosler | |
| 2009/0029117 A1 | 1/2009 | Aoi et al. | |
| 2009/0323502 A1 | 12/2009 | Murata et al. | |
| 2010/0246008 A1 | 9/2010 | Murata et al. | |
| 2011/0266576 A1 | 11/2011 | Engl et al. | |
| 2012/0040044 A1 | 2/2012 | Uehira et al. | |
| 2013/0221651 A1 | 8/2013 | Genda | |
| 2013/0239619 A1 | 9/2013 | Wintzer et al. | |
| 2013/0242590 A1 | 9/2013 | Fedosik et al. | |
| 2013/0250595 A1 | 9/2013 | Fedosik et al. | |
| 2013/0250596 A1 | 9/2013 | Fedosik et al. | |
| 2013/0250597 A1 | 9/2013 | Fedosik et al. | |
| 2013/0258694 A1 | 10/2013 | Fedosik et al. | |
| 2014/0033767 A1 | 2/2014 | Wintzer et al. | |
| 2014/0042650 A1 | 2/2014 | Muhle et al. | |
| 2014/0286032 A1 | 9/2014 | Fedosik et al. | |
| 2014/0332991 A1 | 11/2014 | Giessauf et al. | |
| 2014/0347876 A1 | 11/2014 | Fedosik et al. | |
| 2015/0036976 A1 | 2/2015 | Wintzer et al. | |
| 2015/0109810 A1 | 4/2015 | Wintzer et al. | |
| 2015/0124472 A1 | 5/2015 | Wintzer et al. | |
| 2015/0224723 A1 | 8/2015 | Hamkens | |
| 2015/0292701 A1 | 10/2015 | Wintzer et al. | |
| 2015/0300587 A1 | 10/2015 | Scheibner et al. | |
| 2015/0330590 A1 | 11/2015 | Wintzer et al. | |
| 2015/0369436 A1 | 12/2015 | Wintzer et al. | |
| 2016/0082679 A1 * | 3/2016 | Kikuchi | G02B 1/04 264/1.7 |
| 2017/0327402 A1 | 11/2017 | Fujii | |
| 2018/0251395 A1 | 9/2018 | Akiba et al. | |
| 2018/0283639 A1 | 10/2018 | Tessmer et al. | |
| 2018/0328558 A1 | 11/2018 | Okubo | |
| 2019/0041556 A1 | 2/2019 | Iwata | |
| 2019/0331310 A1 | 10/2019 | Wintzer et al. | |
| 2020/0195823 A1 | 6/2020 | Furutake | |
| 2021/0130738 A1 | 5/2021 | Rougemont | |
| 2022/0177345 A1 | 6/2022 | Dittmann et al. | |
| 2022/0289612 A1 | 9/2022 | Diatta et al. | |
| 2022/0298050 A1 | 9/2022 | Kuppe et al. | |
| 2022/0373151 A1 | 11/2022 | Zhang et al. | |

FOREIGN PATENT DOCUMENTS

| | | |
|---|---|---|
| CN | 106166822 * | 11/2016 |
| DE | 1 099 964 | 2/1961 |
| DE | 2906858 | 9/1980 |
| DE | 36 02 262 | 5/1987 |
| DE | 299 14 114 | 11/1999 |
| DE | 69701714 | 2/2001 |
| DE | 102 26 471 | 1/2004 |
| DE | 10 2005 009 556 | 9/2005 |
| DE | 10116139 B4 | 4/2006 |
| DE | 102006034431 A1 | 1/2008 |
| DE | 10 2008 034153 | 1/2010 |
| DE | 102008054029 | 5/2010 |
| DE | 10100515 B4 | 12/2010 |
| DE | 102011114636 A1 | 4/2013 |
| DE | 102012205196 | 10/2013 |
| DE | 20 2014 100462 | 3/2014 |
| DE | 10 2016 001609 | 8/2016 |
| DE | 102015001609 | 8/2016 |
| DE | 10 2015 007 832 | 12/2016 |
| DE | 102016102408 A1 | 6/2017 |
| DE | 10 2017 105 888 | 9/2018 |
| DE | 10 2015 012 324 | 6/2019 |
| DE | 10 2020 115078 | 1/2021 |
| DE | 102021130715 A1 | 6/2022 |
| DE | 102021105560 A1 | 9/2022 |
| EP | 1954642 B1 | 4/2009 |
| EP | 2402140 * | 1/2012 |
| EP | 2666620 | 11/2013 |
| EP | 3312501 | 4/2018 |
| EP | 3520983 | 8/2019 |
| EP | 3575362 | 12/2019 |
| JP | 01072822 | 3/1989 |
| JP | H06166526 | 6/1994 |
| JP | H06-286754 | 10/1994 |
| JP | H07330347 A | 12/1995 |
| JP | 2002160256 | 6/2002 |
| JP | 2003048728 A | 2/2003 |
| JP | 2003246630 | 9/2003 |
| JP | 2004009379 | 1/2004 |
| JP | 2006062359 | 3/2006 |
| JP | 4400798 | 1/2010 |
| JP | 2010046895 | 3/2010 |
| JP | 2018118900 | 8/2019 |
| JP | 2019135202 | 8/2019 |
| KR | 20160028901 | 3/2016 |
| KR | 101971276 | 4/2019 |
| WO | 2004/096724 | 11/2004 |
| WO | 2009/036739 | 3/2009 |
| WO | 2009/109209 | 9/2009 |
| WO | 2012072187 A2 | 6/2012 |
| WO | 2012072188 A1 | 6/2012 |
| WO | 2012072189 A2 | 6/2012 |
| WO | 2012072190 A2 | 6/2012 |
| WO | 2012072191 A2 | 6/2012 |
| WO | 2012072192 | 6/2012 |
| WO | 2012072192 A1 | 6/2012 |
| WO | 2012072193 A2 | 6/2012 |
| WO | 2012130352 A1 | 10/2012 |
| WO | 2013068053 A1 | 5/2013 |
| WO | 2013068063 A1 | 5/2013 |
| WO | 2013123954 A1 | 8/2013 |
| WO | 2013135259 A1 | 9/2013 |
| WO | 2013159847 A1 | 10/2013 |
| WO | 2013170923 A1 | 11/2013 |
| WO | 2013178311 A1 | 12/2013 |
| WO | 2014072003 A1 | 5/2014 |
| WO | 2014114307 A1 | 7/2014 |
| WO | 2014114308 A1 | 7/2014 |
| WO | 2014114309 A1 | 7/2014 |
| WO | 2014131426 A1 | 9/2014 |
| WO | 2014/161014 | 10/2014 |
| WO | 2017059945 A1 | 4/2017 |
| WO | 2017/207079 | 12/2017 |
| WO | 2017215775 A1 | 12/2017 |
| WO | 2019/072326 | 4/2019 |
| WO | 2019/179571 | 9/2019 |
| WO | 2019243343 A1 | 12/2019 |
| WO | 2021/008657 | 1/2021 |
| WO | 2021008647 | 1/2021 |

OTHER PUBLICATIONS

Audi—Vorsprung durch Technik, http://web.archive.org/web/20150109234745/http://www.audi.de/content/de/brand/de/vorsprung_durch_technik/content/2013/08/Audi-A8-erstrahlt-in-ne, May 22, 2023.

Vehicle Bodies, Bosch Automotive Handbook, 9th Edition, 2014, p. 1040.

Digital Light: Millions of Pixels on the Road, https://www.al-lighting.com/news/article/digital-light-millions-of-pixels—Oct. 31, 2018.

(56) References Cited

OTHER PUBLICATIONS

Hella bringt neues SSL-HD-Matrix-Lichtsystem auf den Markt, https://www.springerprofessional.de/fahrzeug-lichttechnik/fahrzeugsicherheit/hella-bringt-neues-ssl-hd-matrix-lichtsystem-auf-den-markt/17182758, Sep. 18, 2019.
Von Alfred Vollmer, "Matrix-LED- und Laserlicht bietet viele Vorteile", https://www.all-electronics.de/automotive-transportation/matrix-led-und-laserlicht-bietet-viele-vorteile.html, Apr. 15, 2014.
SSL|HD: hochintegriertes HD-LED-Lichtsystem von Hella, https://www.highlight-web.de/5874/hella-ssl-hd/, Sep. 13, 2019.
Hopmann, Christian et al., "Technologie des Spritzgießens" Lern- und Arbeitsbuch, 2017, pp. 19, 29, 57-59, 64-70.
Unser Digital Light SSL | HD-Lichtsystem: ein neuer Meilenstein der automobilen Lichttechnik | HELLA, https://www.hella.com/techworld/de/Lounge/Unser-Digital-Light-SSL-HD-Lichtsystem-ein-neuer-Meilenstein-der-automobilen-Lichttechnik-55548/, 11 pages.
International Preliminary Report on Patentability Issued May 8, 2023 for PCT/DE2021/100858.
International Search Report and Written Opinion Issued May 6, 2021 For PCT/DE2021/100035.
International Search Report and Written Opinion Issued on Feb. 4, 2022 for Corresponding PCT Application No. PCT/DE2021/100840.
International Search Report Issued Jan. 26, 2021 for Corresponding PCT Application No. PCT/DE2020/100860.
International Search Report and Written Opinion Issued May 20, 2019 For Corresponding PCT Application No. PCT/DE2019/100249.
International Preliminary Report on Patentability Issued on Jan. 18, 2022 In Corresponding PCT Application No. PCT/DE2020/100478.
International Search Report and Written Opinion Issued on Sep. 16, 2020 In Corresponding PCT Application No. PCT/DE2020/100478.
Office Action Dated Mar. 20, 2020 for Corresponding Patent Application No. DE 10 2019 119 040.1.
Office Action Dated Feb. 19, 2020 for Corresponding Patent Application No. DE 10 2019 119 042.8.
International Preliminary Report on Patentability Issued on Jan. 18, 2022 In Corresponding PCT Application No. PCT/DE2020/100609.
International Search Report and Written Opinion Issued on Oct. 16, 2020 in Corresponding PCT Application No. PCT/DE2020/100609.
International Preliminary Report on Patentability Issued on Sep. 22, 2020 for Corresponding PCT Application No. PCT/DE2019/100249.
German Office Action Dated Jul. 13, 2021 for Corresponding Patent Application No. DE 10 2020 127 638.9.
International Search Report and Written Opinion Issued on Apr. 8, 2021 in Corresponding PCT Application No. PCT/DE2020/101007.
International Preliminary Report on Patentability Issued on May 17, 2022 for Corresponding PCT Application No. PCT/DE2020/101007.
Search Report Issued on Nov. 22, 2021 for Corresponding Patent Application No. DE 10 2021 105 560.1.
International Preliminary Report on Patentability Issued on Apr. 12, 2022 for Corresponding PCT Application No. PCT/DE2020/100860.
International Preliminary Report on Patentability Issued in Corresponding PCT Application No. PCT/DE2021/100136 Dated Aug. 23, 2022.
International Preliminary Report on Patentability Issued on Jul. 19, 2022 for Corresponding PCT Application No. PCT/DE2021/100035.
International Search Report and Written Opinion Issued May 25, 2021 for PCT/DE2021/100136.
Audi Matrix LED-Scheinwerfer, https://web.archive.org/web20150109234745/http://audi.de/content/de/brand/de/vorsprung_durch_technik/content/2013/08/Audi-A8, Jun. 28, 2022, 3 pages.
Veb Jena Glaswerk Schott & Gen, "Structure and Nature of Glass", 1st Edition, Sep. 1, 1974, 3 pages.
Vollmer, Alfred, "Matrix-LED-und Laserlicht bietet viele Vorteile", all-electronics, https://www.all-electronics.de/automotive-transportation/matrix-led-under-laserlicht-bietet-viele-vorteile.html, Apr. 15, 2014, 12 pages.
Schafer, Patrick "Hella bringt neues SSL-HD-Matrix Lichtsystem auf den Markt", Sep. 18, 2019, Springer Professional, 3 pages.
Authors' Collective, "Glass Technology", Glastechnik, Leipzig 1972, 12 pages.

\* cited by examiner

P4014

P4012

P4014
P4012
P4014

P4016

P4017
P4016

P415
P403
P4031'

METHOD FOR PRODUCING AN OPTICAL ELEMENT FROM PLASTIC

FIELD OF THE DISCLOSURE

The present disclosure relates to a method for producing an optical element having at least one optically effective surface, wherein liquid transparent plastic is injection-molded by means of a first injection mold of an injection molding machine to form a preform and/or a pre-molded part having at least one preform, wherein the preform and/or the pre-molded part is thereafter cooled outside the first injection mold and/or outside the injection molding machine, and wherein the preform is thereafter injection molded and/or over-molded in a second injection mold (of the or an injection molding machine) into an optical element by applying at least one layer of plastic forming the optically effective surface onto the preform.

BACKGROUND

Such a so-called multi-cavity process is disclosed, for example, in WO 2014/161014 A1 and WO 2019/179571 A1. For example, WO 2014/161014 A1 discloses a process for producing an injection-molded part, for example an optical element, wherein an injection molding compound is molded at at least two injection stations by means of at least two injection operations, wherein a preform produced in one of the at least two injection operations is cooled in a cooling station between the at least two injection operations. The aim of the multi-cavity process is to select the layer thicknesses in such a way that the cycle time is optimally short (see for example DE 10 2008 034 153 B4).

SUMMARY

The present disclosure concerns a method for producing an optical element having at least one optically effective surface, wherein by means of a first injection mold of an injection molding machine (a first) liquid transparent plastic is injection molded into a preform and/or into a pre-molded part having at least one preform, wherein the preform and/or the pre-molded part is thereafter cooled outside the first injection mold and/or outside the injection molding machine, and wherein the preform (and/or the pre-molded part) is thereafter injection-molded and/or over-molded in a second injection mold (of the or an injection molding machine) to form an optical element by applying at least one layer of (the first or a second) plastic forming the optically effective surface onto the preform.

DETAILED DESCRIPTION

Figure 1:
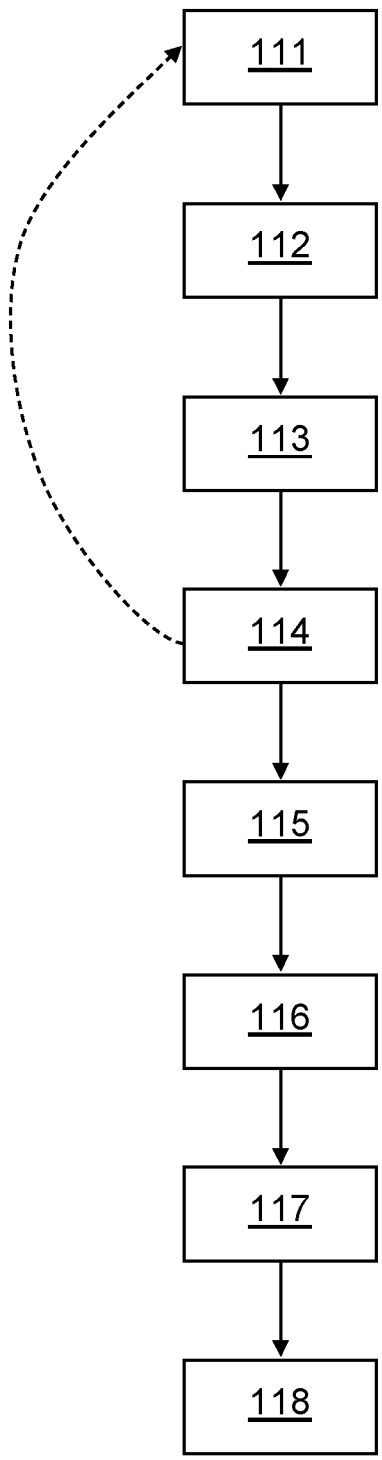
FIG. 1 shows an embodiment of a method for producing an optical element.

The present disclosure concerns a method for producing an optical element having at least one optically effective surface, wherein by means of a first injection mold of an injection molding machine (a first) liquid transparent plastic is injection molded into a preform and/or into a pre-molded part having at least one preform, wherein the preform and/or the pre-molded part is thereafter cooled outside the first injection mold and/or outside the injection molding machine, and wherein the preform (and/or the pre-molded part) is thereafter injection-molded and/or over-molded in a second injection mold (of the or an injection molding machine) to form an optical element by applying at least one layer of (the first or a second) plastic forming the optically effective surface onto the preform, and wherein the layer forming the optically effective surface is not thicker than 1 mm, for example not thicker than 0.75 mm, for example not thicker than 0.5 mm.

The present disclosure concerns further a method for manufacturing an optical element
- with at least one optically effective light exit surface or
- with at least one optically effective light exit surface and with at least one optically effective light entrance surface wherein by means of a first injection mold of an injection molding machine (a first) liquid transparent plastic is injection molded into a preform and/or into a pre-molded part having at least one preform, wherein the preform and/or the pre-molded part is thereafter cooled outside the first injection mold and/or outside the injection molding machine, and wherein the preform is thereafter injection-molded and/or over-molded in a second injection mold (of the or an injection molding machine) to form an optical element by applying at least one layer of (the first or a second) plastic material forming the light exit surface onto the preform, and wherein the layer forming the optically effective light exit surface is not thicker than 1 mm, for example not thicker than 0.75 mm, for example not thicker than 0.5 mm.

In an illustrative embodiment, the preform is injection-molded and/or over-molded in the second injection mold (of the or an injection molding machine) to form the optical element by applying at least one layer of (the first or a second) plastic forming the optically effective light entrance surface to the preform in such a way that the layer forming the optically effective light entrance surface is not thicker than 1 mm, for example not thicker than 0.75 mm, for example not thicker than 0.5 mm.

In one embodiment, a surface structure, such as a microlens or a number of microlenses, is formed in an optically effective surface of the optical element in a second or a final injection molding step (pressing step). In a further illustrative embodiment, the layer forming the optically effective light exit surface comprises projection lenses. A surface structure in the sense of the present disclosure is for example a structure (for example deterministically arranged) which is part of the contour of an optically effective surface, an optically effective light exit surface, or an optically effective light entrance surface. A surface structure in the sense of this disclosure serves for example for the targeted alignment of light.

In a further illustrative embodiment, the layer forming the optically effective light exit surface, including the projection lenses, is not thicker than 1 mm, for example not thicker than 0.75 mm, for example not thicker than 0.5 mm. Projection lenses within the meaning of this disclosure are for example microlenses.

In one embodiment, the layer forming the projection lenses between at least two and/or between at least three and/or between at least four and/or between at least five and/or between the projection lenses is no thicker than 1 mm, for example no thicker than 0.75 mm, for example no thicker than 0.5 mm.

The disclosure concerns further a method for producing an optical element having at least one optically effective light entrance surface, wherein by means of a first injection mold of an injection molding machine (a first) liquid transparent plastic is injection molded into a preform and/or into a pre-molded part having at least one preform, wherein the preform and/or the pre-molded part is thereafter cooled outside the first injection mold and/or outside the injection molding machine, and wherein the preform is thereafter injection-molded and/or over-molded in a second injection mold (of the or an injection molding machine) to form an optical element by applying at least one layer of (the first or a second) plastic material forming the light entrance surface onto the preform, and wherein the layer forming the optically effective light entrance surface is not thicker than 1 mm, for example not thicker than 0.75 mm, for example not thicker than 0.5 mm.

In a further illustrative embodiment, liquid transparent plastic and/or the first plastic is injection-molded by means of a third injection mold of one or the (first or the second) injection molding machine to form a pre-preform and/or a pre-pre-molded part having at least one pre-preform, wherein the pre-preform and/or the pre-pre-molded part is thereafter cooled outside the third injection mold and/or outside the injection molding machine, and wherein the pre-preform is thereafter injection molded and/or over-molded in the first injection mold to form the preform by applying plastic to the pre-preform.

For example, it is provided that the layer forming the optically effective surface and/or the layer forming the light entrance surface and/or the layer forming the light exit surface is not thinner than 5 µm and/or not thinner than 50 µm and/or not thinner than 100 µm.

In further illustrative embodiment, the method is supplemented by one or more of the following features (see WO 2019/179571 A1):

(i) It is advantageously provided that at least 16 optical elements such as 16 lenses or preforms are injection-molded in one injection molding step. For example, it is provided that at least eight units comprising a sprue and at least two optical elements or preforms are injection-molded in one step. It is advantageously provided that at least 32 optical elements, such as lenses or preforms, are injection-molded in one injection molding step. For example, it is envisaged that at least 16 units, comprising a sprue and at least two optical elements such as two lenses (blanks) or preforms, are injection-molded in one step.

(ii) The sprue is advantageously connected directly to the optical element and advantageously not indirectly via the optically non-effective edge.

(iii) The sprue remains on the preform or optical element after removal. Advantageously, the sprue is not separated until after the optical element has been injection molded or the injection-molded part has been removed.

(iv) It is advantageously provided that the ejection at the optical surface or at a surface of a preform or a pre-molded part takes place (point of application of the ejector) where (for the optical properties relevant) light flow is provided in the operation as intended. Contrary to expectations, this increases process stability without impairing the optical properties.

(v) At least two preforms are injection-molded with one sprue.

(vi) Design of the edge, where the edge is to be understood as the part of the optical element to which no optical function is assigned: The edge is not manufactured in the first injection molding step. The edge is manufactured in the second injection molding step or in the last injection molding step.

(vii) Handling and/or alignment of the preform in the mold for injection molding of the molded part is performed using the sprue.

(viii) The second sprue runs at least partly along the first sprue (ix) The sprue is relatively thick. The volume of the sprue corresponds to at least 30% of the volume of the pre-molded part or the injection-molded part.

(x) Two or more preforms or lens elements (injection molding elements) are assigned to a sprue.

(xi) In an illustrative embodiment, the injection molding device comprises at least one hot runner. The hot runner or the predominant part of the hot runner advantageously has a cross-sectional area of not less than 25 mm$^2$, advantageously of not less than 40 mm$^2$. The cross-sectional area of a hot runner in the sense of the present disclosure is for example a cross-sectional area orthogonal to the longitudinal direction of the hot runner or orthogonal to the flow direction/average flow direction of the liquid plastic in the hot runner.

(xii) A modular mold concept is provided which has a basic mold and at least one injection-molding-element-dependent and/or preform-dependent mold set (adapter mold). The sprue with its complex structures is assigned to the basic mold, whereas the optical elements (injection molding elements) and the preforms are assigned to the adapter mold (which can also be referred to as an insert mold). For example, the modular design of the mold or the tool is such that the same hot runner is provided or used for different lens shapes.

(xiii) In addition to the cooling station, a reservoir with pre-molded parts is provided. The handling robot can optionally remove pre-molded parts together with the sprue from the cooling station or from the (additional) reservoir. This means that two, for example different, types of cooling stations are provided.

(xiv) The pre-molded parts in the additional reservoir are kept heated or heated before being placed in the mold for injection molding of the injection-molded part.

(xv) The preforms or pre-molded parts are not deposited on an optical surface immediately after injection molding or after removal from the tool for injection molding of the preform. For example, it is intended that the pre-molded parts or the injection-molded parts are deposited on the sprue.

(xvi) The sprue is used for alignment, with a series of abutment surfaces or extensions or blind extensions or appendices branching off from the actual sprue. The sprue also includes centering pins. The sprue has at least two mandrels for aligning the sprue, and thus the pre-molded part, in the injection mold for injection molding the injection-molded part.

(xvii) The sprue advantageously has a cross-sectional area of not less than 25 mm$^2$, advantageously of not less than 40 mm$^2$. The sprue advantageously has over a substantial portion thereof a cross-sectional area of not less than 25 mm$^2$, advantageously of not less than 40 mm$^2$. The sprue advantageously has over a major or most portion of its length a cross-sectional area of not less than 25 mm$^2$, advantageously of not less than 40 mm$^2$. For the purposes of this disclosure, the cross-sectional area of a sprue is for example a cross-sectional area orthogonal to the longitudinal direction of the sprue or orthogonal to the direction of flow/mean direction of flow of the liquid plastic in the sprue.

(xviii) A pre-molded part or an injection molded part advantageously remains in the injection mold (in the tool) or in the closed injection mold (in the closed tool) for 130 to 180 seconds or no more than 180 seconds. This includes both the time for injection molding and the time for post molding.

An optical element within the meaning of this disclosure is, for example, a headlight lens. An optical element within the meaning of the present disclosure is, for example, a headlight lens for imaging a bright-dark-boundary on a roadway. An optical element within the meaning of the present disclosure is, for example, a converging lens. A finished molded lens or an optical element in the sense of the present disclosure is, for example, a lens (or an optical element) having a volume of at least 50 cm$^3$ without a sprue.

The term "preform" is used in this disclosure in accordance with WO 2014/161014 A1, whereas the term "injection-molded part" is used in deviation from WO 2014/161014 A1 to refer to a lens body (including rim) or several lens bodies (including rim) including sprue.

For example, the following terminology is used: A pre-molded part comprises at least one sprue and at least one preform. A pre-molded part may also comprise a sprue with two or more preforms. An injection molded part includes at least one sprue and at least one optical element, or at least one sprue and at least one lens. An optical element or lens comprises a lens body and optionally a lens rim or edge.

It is advantageously injection molded at a pressure of 800 bar to 1000 bar.

In one embodiment, a light-scattering surface structure is formed in an optically effective surface of the optical element in the second or final injection molding step. A suitable light-scattering surface structure comprises, for example, a modulation and/or a (surface) roughness of at least 0.05 µm, for example at least 0.08 µm, or is designed as a modulation with a (surface-) roughness of at least 0.05 µm, for example at least 0.08 µm. Roughness in the sense of the disclosure shall be defined for example as Ra, for example according to ISO 4287. In a further advantageous embodiment of the disclosure, the light-scattering surface structure may comprise a structure modeled after a golf ball surface or be designed as a structure modeled after a golf ball surface. Suitable light scattering surface structures are disclosed, for example, in DE 10 2005 009 556 A1, DE 102 26 471 B4 and DE 299 14 114 U1. Further usable embodiments of light-scattering surface structures are disclosed in German patent specification 1 099 964 A, DE 36 02 262 C2, DE 40 31 352 A1, U.S. Pat. No. 6,130,777 and US 2001/0033726 A1.

The optical element (according to the disclosure) or a corresponding lens is also used, for example, in a projection headlight. In the design as a headlight lens for a projection headlight, the optical element or a corresponding headlight lens reproduces the edge of a shield as the bright-dark-boundary on the road.

The present disclosure concerns further a method of manufacturing a vehicle headlight, wherein an optical element manufactured by a method having one or more of the aforementioned features is installed in a headlight housing.

The present disclosure concerns further a method for manufacturing a vehicle headlight, wherein an optical element manufactured by a method having one or more of the aforementioned features is placed in a headlight housing and is assembled together with at least one light source or a plurality of light sources to form a vehicle headlight.

The present disclosure concerns also a method for producing a vehicle headlight, wherein an optical element produced by a method having one or more of the abovementioned features is placed in a headlight housing as a secondary optics or as part of a secondary optics comprising a plurality of lenses for imaging a light output surface of an attachment optics and/or an illumination pattern generated by means of a primary optics and is assembled together with at least one light source or a plurality of light sources and the attachment optics to form a vehicle headlight.

The present disclosure concerns further a method of manufacturing a vehicle headlight, wherein a primary optics or an attachment optics array is manufactured as a primary optics for generating the illumination pattern in accordance with a method having one or more of the foregoing features.

The present disclosure concerns further a method for manufacturing a vehicle headlight, wherein the primary optics comprises a system of movable micromirrors, for example a system of more than 100,000 movable micromirrors, for example a system of more than 1,000,000 movable micromirrors, for generating the illumination pattern The present disclosure concerns further a method for manufacturing an objective, wherein at least a first lens is manufactured according to a method having one or more of the aforementioned features and is subsequently installed in an objective and/or an objective housing. In a further illustrative embodiment, at least a second lens is manufactured according to a method having one or more of the aforementioned features and is subsequently installed in an objective and/or an objective housing. In a further illustrative embodiment, at least a third lens is manufactured according to a method having one or more of the aforementioned features and is subsequently installed in an objective and/or an objective housing. In a further illustrative embodiment, at least a fourth lens is manufactured according to a method having one or more of the aforementioned features and is subsequently installed in an objective and/or an objective housing.

The present disclosure concerns further a method for manufacturing a camera, wherein an objective manufactured according to a method having one or more of the aforementioned features is installed together with a sensor or light-sensitive sensor in such a way that an object can be imaged onto the sensor by means of the objective. The aforementioned objective and or aforementioned camera may be used as sensors or environmental sensors for use for vehicle headlights, such as the aforementioned vehicle headlights, and/or in driving assistance systems. The method is also advantageously for the production of lenses for finger scanners, such as those described in German patent application DE 10 2019 126 419 A1.

The present disclosure concerns further a method for manufacturing a microprojector or a microlens array, wherein the microlens array is manufactured according to an aforementioned method with one or more of the aforementioned features. For manufacturing a projection display the microlens array comprising a plurality of microlenses and/or projection lenses arranged on a carrier or substrate is assembled together with object structures and a light source, for example for illuminating the object structures. The method is used for microlens arrays with a plurality of microlenses and/or projection lenses on a planar base surface, but advantageously also on a (for example concave) curved base surface. For example, it is provided that the object structures (on a side of the carrier or substrate facing away from the microlenses and/or projection lenses) are arranged on the carrier or substrate.

Microlenses within the meaning of the present disclosure may be lenses having a diameter of not more than 1 cm or not more than 5 mm. However, microlenses within the meaning of the present disclosure may be, for example, lenses having a diameter of not more than 1 mm. Microlenses within the meaning of the present disclosure may be lenses having a diameter of not less than 0.1 mm. Microlenses within the meaning of the present disclosure are, for example, a plurality of lenses arranged in an array.

A layer forming an optically effective surface or a layer forming an optically effective light entrance surface or a layer forming a light exit surface is for example a layer determining the contour or final contour of the optically effective surface or the optically effective light entrance surface or the light exit surface in the sense of this disclosure. This means, for example, that the final contour is not achieved by post-processing, such as grinding. For example, it is intended that at least 80%, for example at least 90%, is not achieved by post-processing, such as grinding.

A layer forming an optically effective surface or a layer forming an optically effective light entrance surface or a layer forming a light exit surface, for example, is not thicker than X millimeters within the meaning of this disclosure if at least 70%, for example at least 80%, for example at least 90%, of this layer is not thicker than X millimeters.

In an illustrative embodiment, it is provided that the maximum deviation of the actual value from the target value of the distance between two optically active surfaces of the optical element is not greater than 40 µm, for example not greater than 30 µm, for example not greater than 20 µm, for example not less than 2 µm. In an illustrative embodiment, it is provided that the maximum deviation of the actual value from the target value of the distance between an optically active surface and a plane orthogonal to the optical axis of the optically active surface, this plane comprising the geometric center of gravity of the optical element, is not greater than 20 µm, for example not greater than 15 µm, for example not greater than 8 µm, for example not less than 1 µm. In an illustrative embodiment, it is provided that the value RMSt (total surface shape deviation) according to DIN ISO 10110-5 of April 2016 for the optically active surfaces of the optical element, for at least one optically active surface of the optical element and/or for at least two optically active surfaces of the optical element, is not greater than 12 µm, for example is not greater than 10 µm, for example is not greater than 8 µm, for example is not greater than 6 µm, for example is not greater than 4 µm, for example is not greater than 2 µm, for example is not smaller than 0.5 µm.

Plastic in the sense of this disclosure can be, for example, thermoplastic plastic. Thermoplastic plastic in the sense of this disclosure is for example polycarbonate, for example LED 2643, or a thermoplastic resin such as a polycarbonate resin, a polyacrylic resin or a modified polyolefin resin.

Examples of thermoplastic plastics or thermoplastic resins can be taken for example from DE 699 23 847 T2. For example, DE 699 23 847 T2 discloses as polycarbonate resin the suitable use of aromatic polycarbonate resin obtained by reacting a diphenol and a carbonate precursor. Examples of the diphenol in this context include bis-(hydroxyaryl)alkanes, such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hy-droxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert.-butylphenyl)-propane, 2,2-bis-4-hydroxy-3-bromophenyl)-propane, 2,2-bis-(4-hydroxy-3,5-dibromophenyl)-propane and 2,2-bis-(4-hydroxy-3,5-dichlorophenyl)-propane; Bis-(hydroxyphenyl)-cycloalkane, such as 1,1-bis-(hydroxyphenyl)-cyclopentane and 1,1-bis-(hydroxyphenyl)-cy-clohexane; dihydroxyarylethers, such as 4,4'-dihydroxydiphenylether and 4,4'-dihy-droxy-3,3'-dimethyldiphenyl ether; dihydroxydiarylsulfides, such as 4,4'-dihydroxydiphenylsulfide and 4,4'-dihydroxy-3,3'-dimethyldiphenylsulfide; dihydroxydiarylsulfox-ides, such as 4,4'-dihydroxydiphenylsulfoxide and 4,4'-dihydroxy-3,3'-dimethyldiphenyl sulfoxide; and dihydroxydiarylsulfones, such as 4,4'-dihydroxydiphenylsulfone and 4,4'-dihydroxy-3,3'-dimethyldiphenylsulfone. These diphenols can be used alone or in a combination of two or more products.

Plastics in the sense of this disclosure may be a thermoplastic or a thermoset. The plastic may be a polycarbonate, a PMMA, a COC (=cyclo olefines copolymer). The plastic can be a CR39. In this regard, the respective plastic may have a coefficient of thermal expansion of not less than $6 \times 10^{-5}$ mm/K. In a further embodiment, the plastic may have a coefficient of thermal expansion of not more than $8 \times 10^{-5}$ mm/K. Plastics within the meaning of the present disclosure are, for example, amorphous plastics or polymers. "The atomic structure of polymers mainly involves the nonmetal elements carbon (C), hydrogen (H) and oxygen (O). Nitrogen (N), chlorine (Cl), fluorine (F) and sulfur (S) also occur relatively frequently (heteroatoms)." see Bauer et al: Saechtling Plastics Pocketbook, 31 ed., (2013). Plastics within the meaning of this disclosure may also be or comprise semi-organic polymers. "So-called semi-organic polymers contain the semimetal elements silicon (Si), referred to as silicones or polysiloxanes, and boron (B)." see Bauer et al: Saechtling Plastics Pocketbook, 31 ed., (2013). Plastics in the sense of the present disclosure may also be or comprise siloxanes. A first plastic in the sense of the present disclosure is different from a second plastic in the sense of the present disclosure. A second plastic as defined in the present disclosure may be and/or comprise a semi-organic polymer, a silicone, a polysiloxane, and/or a siloxane.

Motor vehicle in the sense of the disclosure is for example a land vehicle which can be used individually in road traffic. Motor vehicles within the meaning of the disclosure are for example not limited to land vehicles with internal combustion engines.

Figure 2A:
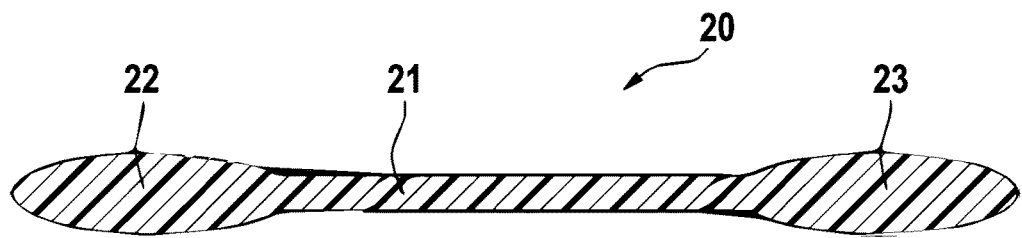
FIG. 2A shows an embodiment of a pre-molded part.

FIG. 1 describes an embodiment of a method for producing an optical element. In this process, a pre-molded part 20, as shown in FIG. 2A, is injected (injection-molded) from plastic in a step 111. Here, in FIG. 2A, reference mark 21 denotes a sprue, and reference marks 22 and 23 each denote a preform.

The pre-molded part 20 is cooled in the injection mold (injection press form) in a step 112 and then removed in a step 113 and fed to a cooling station or a storage unit (also cooling station) outside the injection mold (injection press form).

Figure 2B:
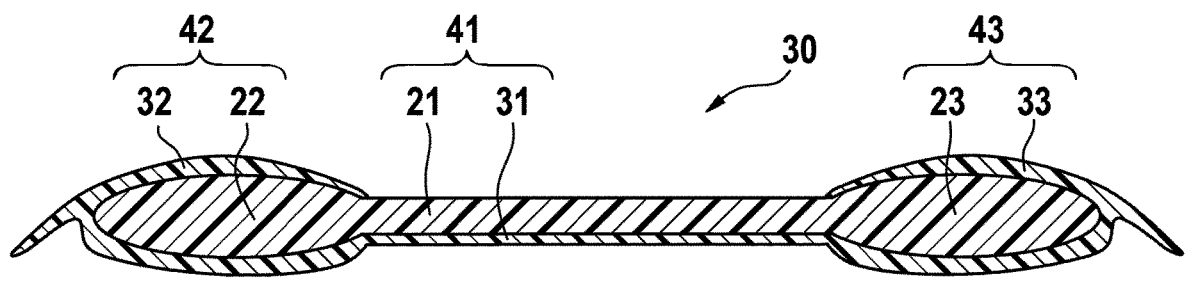
FIG. 2B shows an embodiment of an injection-molded part.
Figure 2C:
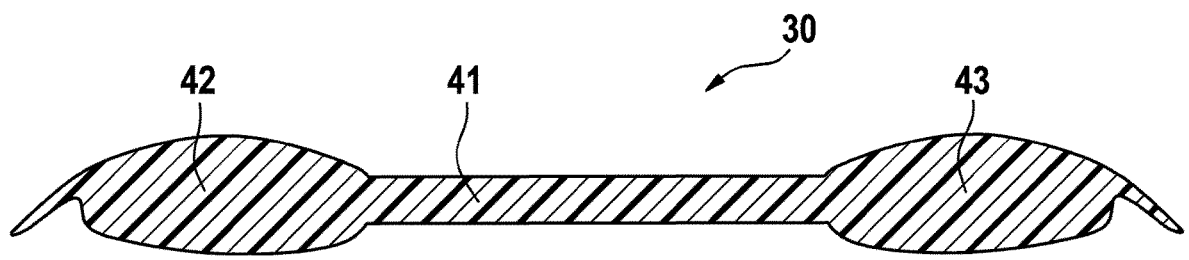
FIG. 2C shows the injection molded part according to FIG. 2B after joining the injection pressing material (injection molding material) of the two molding steps.

This is followed by a step 114 in which the pre-molded part 20 is arranged in a second injection mold. This is followed by an injection molding step analogous to step 111 (injection pressing step) or an injection molding step (injection-pressing step) 115 in which the pre-molded part 20 is injection molded (injection pressed) into an injection molded part 30, as shown in FIG. 2B. Here, reference sign 21 in FIGS. 2A and 2B denotes the sprue of the pre-molded part 20 (see above) and reference sign 31 according to FIG. 2B denotes the additional sprue, with both sprues 21 and 31 forming a sprue denoted by reference sign 41 in FIG. 2B. In FIG. 2B, reference sign 32 denotes plastic for over-molding the preform 22 to form an optical element 42 by means of a layer having a thickness of not more than 1 mm, and reference sign 33 denotes plastic for over-molding the preform 23 to form an optical element 43 by means of a layer having a thickness of not more than 1 mm. FIG. 2C shows the injection molded part 30 with the optical elements 42 and 43 and the sprue 41 in which the injection molding material from the (two) injection molding steps (injection pressing steps) has bonded.

Figure 2D:
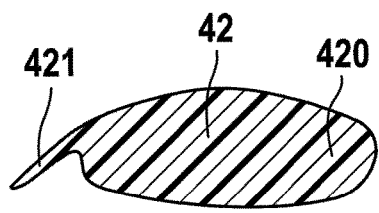
FIG. 2D shows isolated optical elements.
Figure 2D:
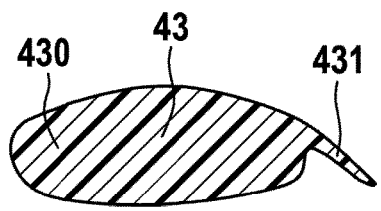
Figure 3:
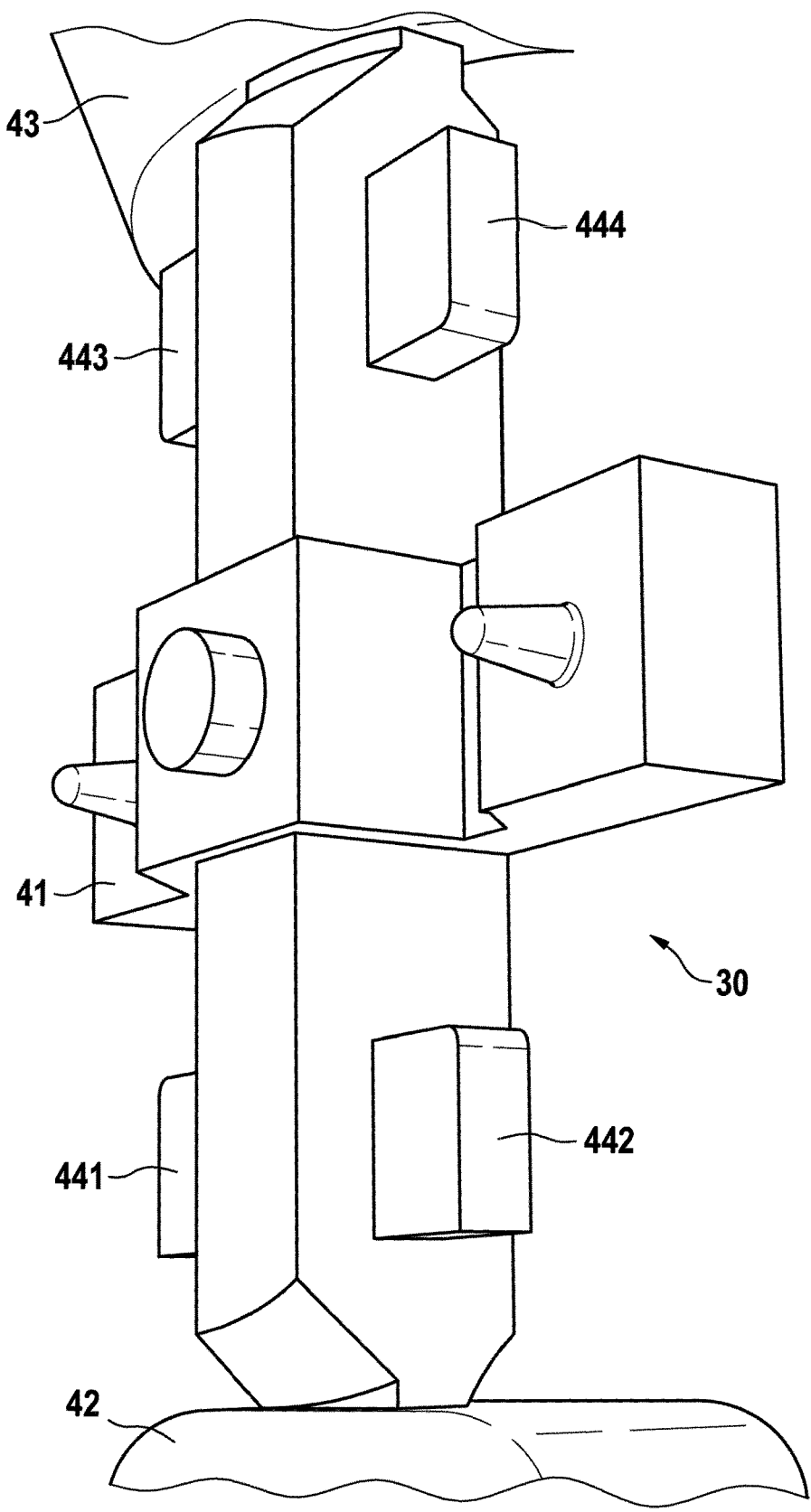
FIG. 3 shows a perspective view of a section of an embodiment of an injection molded part.

Step 115 is followed by a step 116 in which the injection molded part is cooled, followed by a step 117 in which the injection molded part is removed from the injection mold (injection press form) and cooled further. This is followed by a step 118 in which the sprue 41 is separated from the injection molding elements (optical elements) 42 and 43 so that optical elements 42 and 43 are isolated. FIG. 2D shows the separated optical elements 42 and 43. The optical element 42 comprises a lens body 420 and an edge 421. The optical element 43 comprises an optically effective lens body 430 and an edge 431. FIG. 3 shows the injection molded part 30 in another view. The blind extensions designated by reference numerals 441, 442, 443, 444 may also be omitted.

Figure 4:
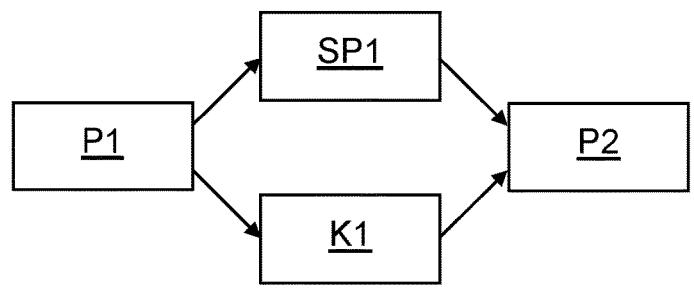
FIG. 4 shows a schematic view of a device for implementing the producing process described with reference to FIG. 1.

FIG. 4 shows a schematic view of a device for implementing the producing process described with reference to FIG. 1. Here, P1 denotes an injection molding machine (injection press) for manufacturing a pre-molded part 20, SP1 denotes a reservoir, and K1 denotes a cooling. The cooling K1 serves to transfer the pre-molded part 20 at a suitable temperature to an injection molding machine (injection press) P2 for producing the injection molded part 30. In addition, individual pre-molded parts are phased into the reservoir SP1 so that it holds, for example, a day's production of pre-molded parts. In this way, mold changes and malfunctions can be implemented by decoupling the processes implemented on the injection molding machines (injection presses) P1 and P2 while simultaneously linking them. The tool changes and maintenance concerning the injection molding machines (injection presses) P1 and P2 do not have to be synchronized in this way. For example, if the injection molding machine (injection press) P2 does not accept any pre-molded parts 20, they are placed in the reservoir SP1. If the cooling K1 is empty, a handling robot removes the pre-molded parts from the storage SP1 and feeds them to the injection molding machine (injection press) P2.

Figure 5:
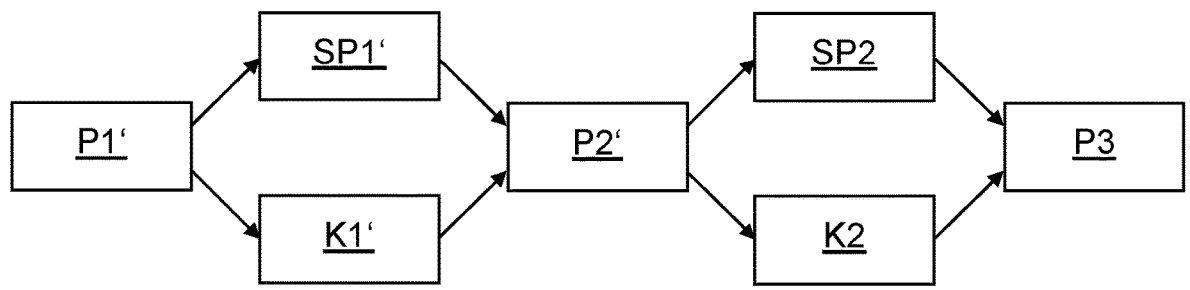
FIG. 5 shows a linkage of three injection presses (injection-molding machines)

This process or architecture is suitable for linking three injection molding machines (injection presses) as shown in FIG. 5. Here, the injection molding machines (injection presses) P1' and P2' as well as P3 are linked via the coolings K1' and K2, but at the same time can be decoupled without influencing the production of the remaining injection molding machines (injection presses) P1', P2' and P3, respectively. An SP1' storage and an SP2 storage are provided for this decoupling.

Figure 6:
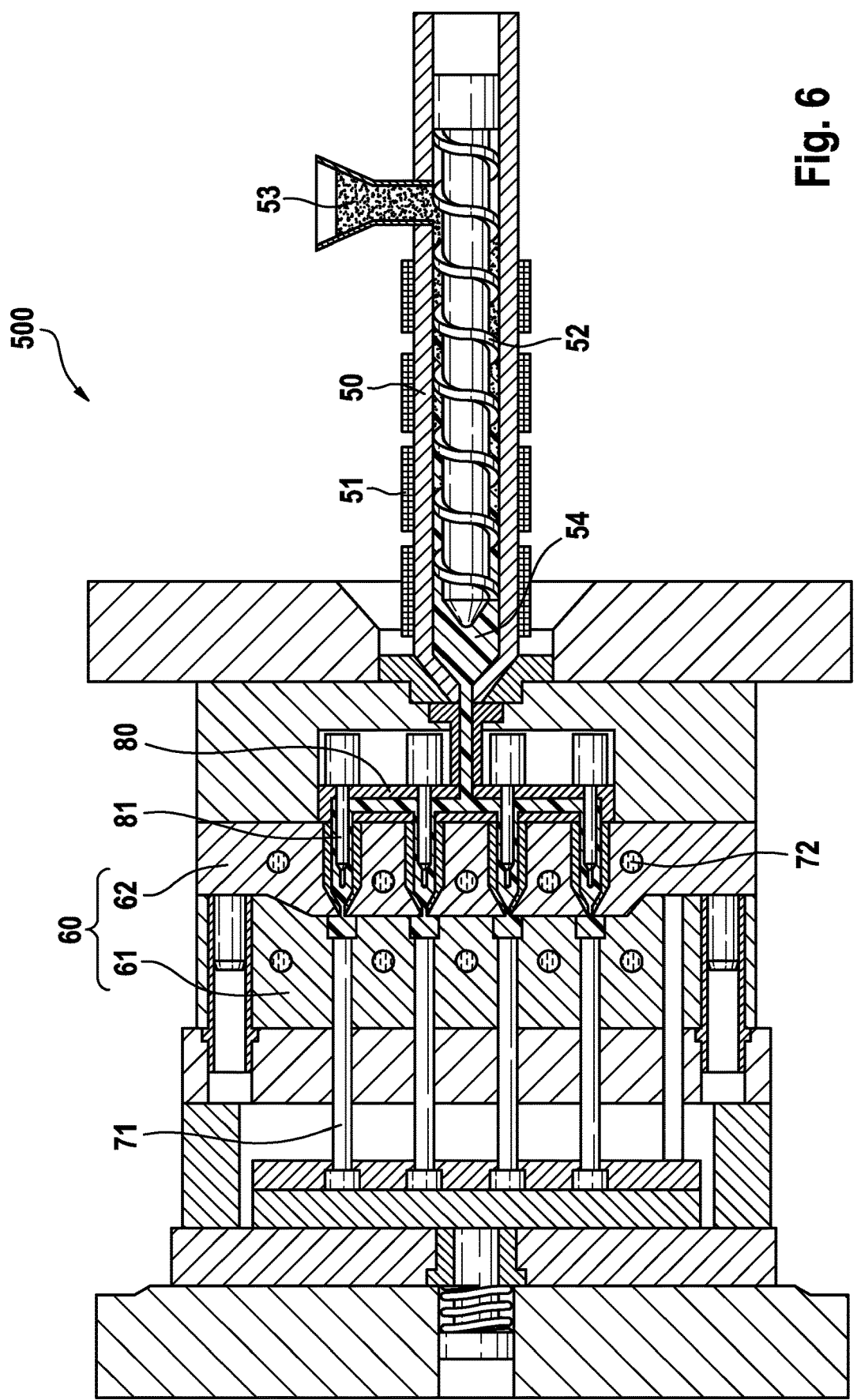
FIG. 6 shows an embodiment of an injection-molding machine shown in principle in a cross sectional view.

FIG. 6 shows an embodiment of an injection molding machine 500 for use of the disclosure. The injection molding machine 500 comprises an injection molding unit 50 having a screw 52 and a heating system 51 for liquefying plastic, which is introduced in the form of granules into a material feeder 53. The plastic liquefied by means of the heating system 51 is indicated by reference numeral 54.

The liquefied plastic 54 is finally pressed into a hot runner system 80 and from there injected into an injection tool 60 via hot runner nozzles 81. The injection tool 60 comprises two part molds 61 and 62 that can be moved apart to remove the pre-molded part or the injection molded part, depending on what is being produced. Reference numeral 72 denotes cooling channels in the injection tool 60. The finished pre-molded parts or injection molded parts are removed using one or more ejectors 71.

Figure 7:
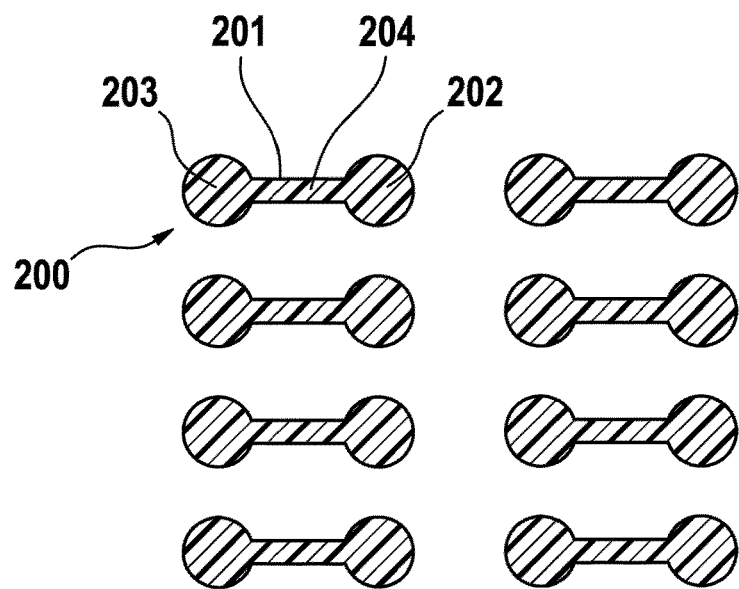
FIG. 7 shows an embodiment of the principle arrangement of pre-molded parts in a tool of an injection-molding machine.
Figure 8:
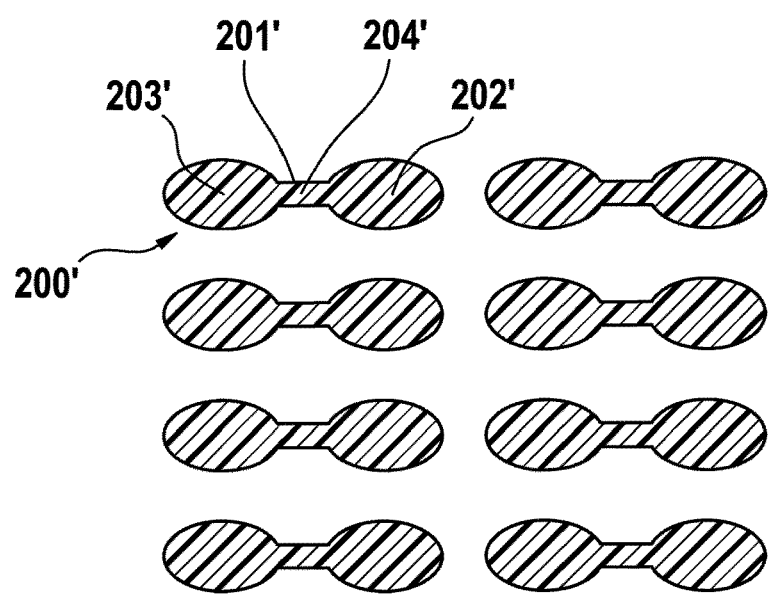
FIG. 8 shows another embodiment for the principle arrangement of pre-molded parts in a tool of an injection molding machine.

In the present embodiment, pre-molded parts are injection molded (pressed) namely 8 in an injection molding step, as exemplified in FIG. 7. Here, reference numeral 200 denotes a pre-molded part (one pre-molded part of 8 pre-molded parts) having two preforms 202 and 203 connected with a sprue 201, and 204 denotes the injection point for liquid plastic for the pre-molded part 200. Reference numeral 71 in FIG. 6 denotes one or more ejectors provided to press on the preforms 202 and 203 to eject them from the part mold 61. The schematic illustration in FIG. 7 shows the pre-molded parts 200 as viewed from the part mold 62 toward the part mold 61. The ejector or ejectors 71 are raised out of the cross-sectional area of the illustration in FIG. 6, so that they do not engage the sprue 201, as might appear from a purely schematic viewpoint, but rather the preforms 202 and 203. Injection molded parts are also produced in a similar manner. In an advantageous manner, it is provided that when the injection molded part or the preform to be injected is changed, a new injection mold or a new tool is provided for injection molding a different pre-molded part with a same hot runner system. That is, the injection point 204 for the pre-molded part 200 is at the same location as the injection point 204' of the pre-molded part 200' shown in FIG. 8. In this case, the pre-molded part 200' comprises two preforms 202' and 203', which are connected to each other via a sprue 201'.

Figure 9:
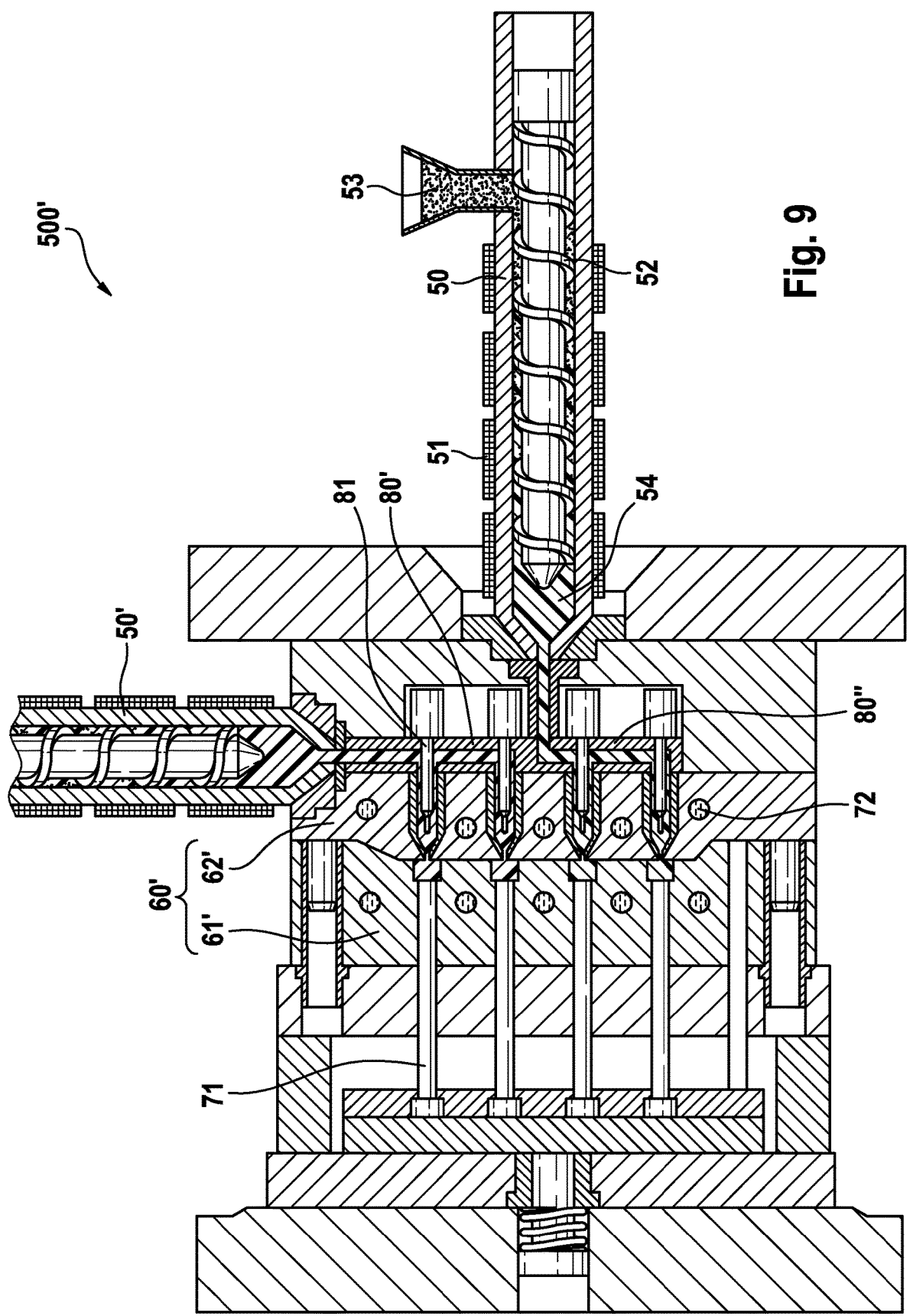
FIG. 9 shows another embodiment of an injection-molding machine in a principle cross-sectional view.

For example, an injection molding machine 500' shown in FIG. 9 can be used to produce injection molded parts, which is modified from the injection molding machine 500. Identical reference signs as in FIG. 6 denote similar or identical elements. In contrast to the injection molding machine 500, the injection molding machine 500' has two hot runner systems 80' and 80''. Here, the hot runner system 80'' is supplied with liquid plastic by the injection molding unit 50, and the hot runner system 80' is supplied by an injection molding unit 50'. The injection molding tool 60' compris es two part molds 61' and 62' that can be moved apart to remove the pre-molded part or the injection molded part, depending on what is being produced.

Figure 10:
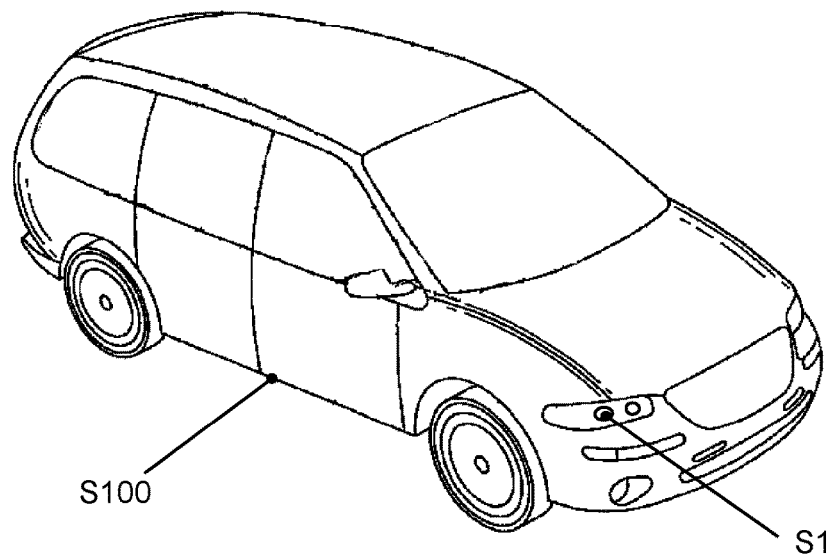
FIG. 10 shows an embodiment of a motor vehicle.
Figure 11:
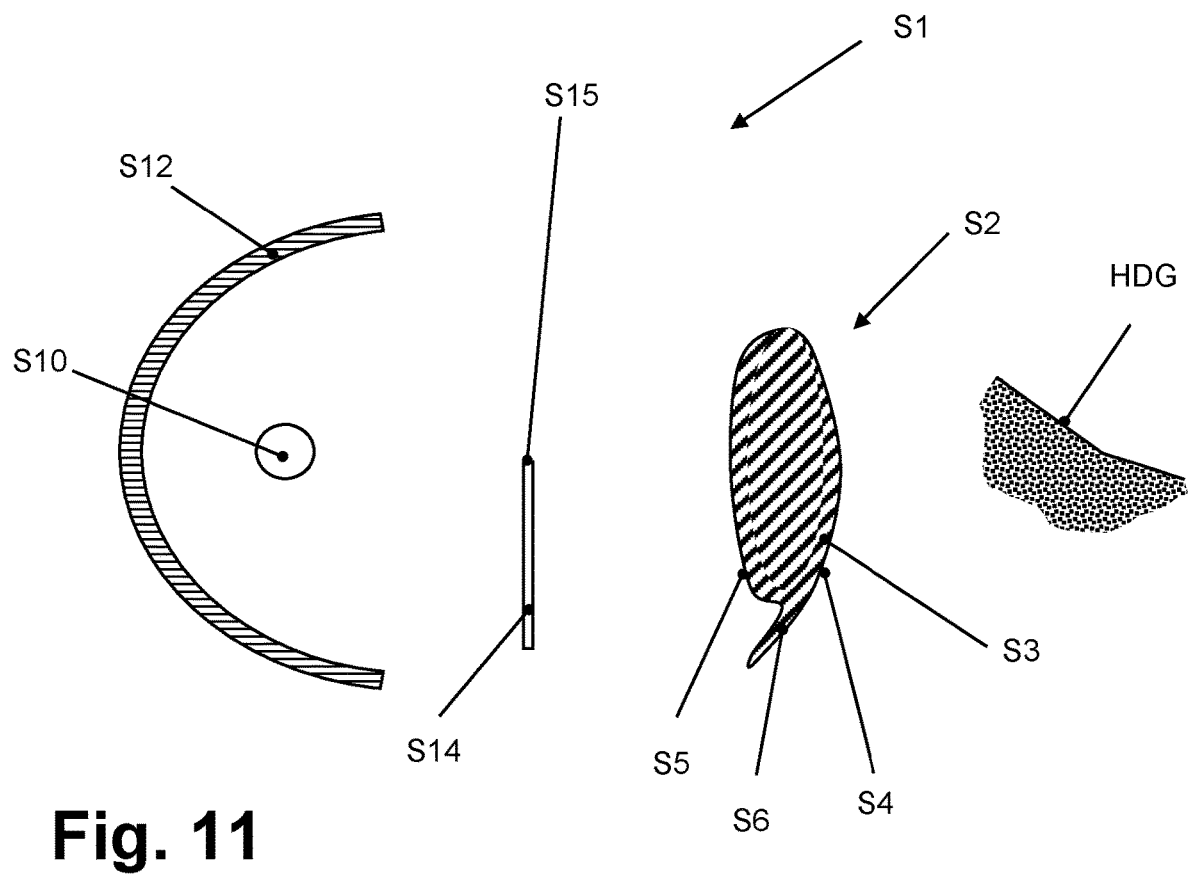
FIG. 11 shows a schematic view of an exemplary vehicle headlight of the motor vehicle according to FIG. 10.

FIG. 10 shows a motor vehicle S100 having a vehicle headlight S1 shown schematically in FIG. 11 with a light source S10 for generating light, a reflector S12 for reflecting light that can be generated by means of the light source S10, and a shield S104. The vehicle headlight S1 further comprises—as an embodiment example of an optical element such as optical elements 42 and 43—a headlight lens S2 for changing the beam direction of light that can be generated by means of the light source S10 and, for example, for imaging an edge of the shield S14 designated by reference character S15 in FIG. 11 as a bright-dark-boundary HDG. The headlight lens S2 comprises a lens body S3 made of a transparent plastic, for example polymer, which comprises a surface S5 facing the light source S10 and a convex curved surface S4 facing away from the light source S10. The headlight lens S2 further comprises, for example, an edge S6 corresponding to the edge 431, by means of which the headlight lens S2 can be fixed in the vehicle headlight S1. Typical requirements for the bright-dark-boundary HDG or for the light distribution taking into account or including the bright-dark-boundary HDG are disclosed, for example, in Bosch-Automotive Handbook, 9th edition, ISBN 978-1-119-03294-6 (incorporated by reference in its entirety), page 1040. The elements in FIG. 11 are drawn with a view to simplicity and clarity and not necessarily to scale. For example, the magnitudes of some elements are exaggerated relative to other elements to enhance understanding of the embodiment of the present disclosure.

Figure 12:
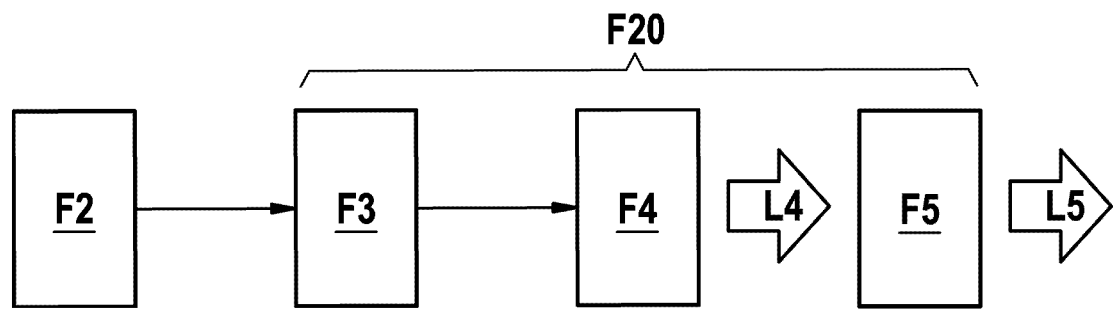
FIG. 12 shows an embodiment of a further vehicle headlight for use in the motor vehicle according to FIG. 10 in a schematic view.
Figure 13:
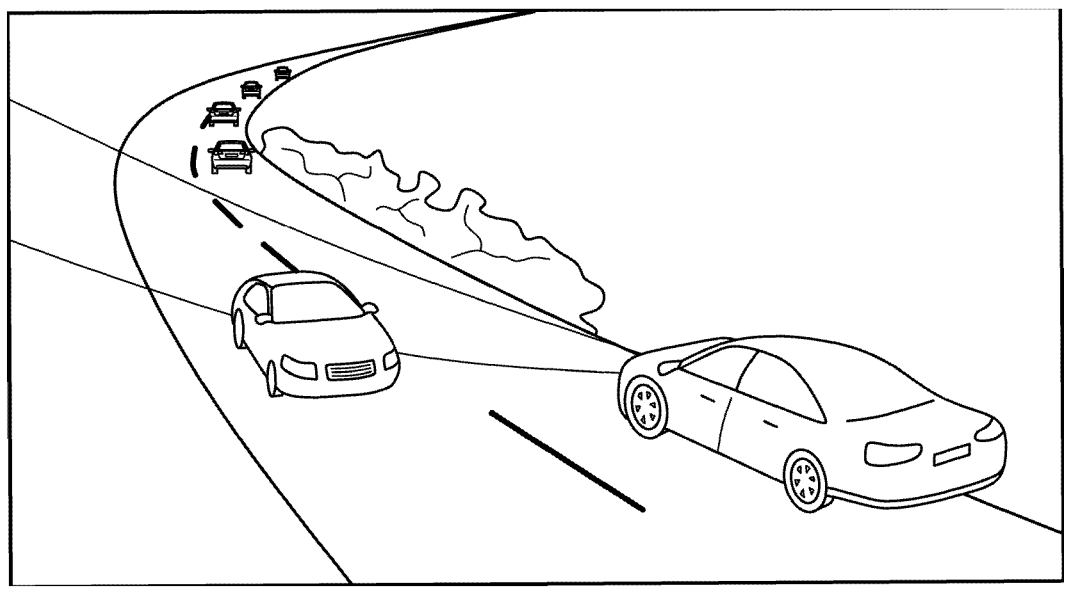
FIG. 13 shows an embodiment of matrix light or adaptive high beam.
Figure 14:
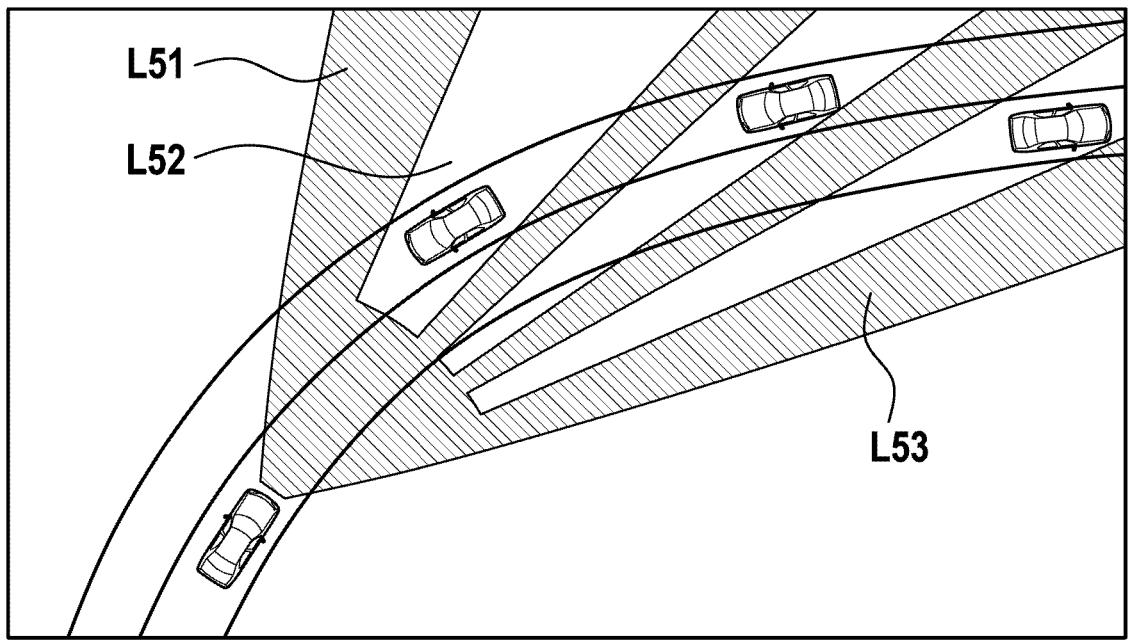
FIG. 14 shows another embodiment of matrix light or adaptive high beam.

FIG. 12 shows an adaptive headlight or vehicle headlight F20—which can be used instead of the vehicle headlight S1—for situation- or traffic-dependent illumination of the surroundings or the road ahead of the motor vehicle S100 as a function of environment sensors F2 of the motor vehicle S100. For this purpose, the vehicle headlight F20 shown schematically in FIG. 12 has an illumination device F4 which is actuated by means of a controller F3 of the vehicle headlight F20. Light L4 generated by the illumination device F4 is emitted as an illumination pattern L5 from the vehicle headlight F20 onto the area in front of the motor vehicle S100 by means of an objective F5, which may comprise one or more optical elements or headlight lenses produced according to the aforementioned method. Examples of corresponding illumination patterns are shown in FIG. 13 and FIG. 14, as well as the websites web.archive.org/web/20150109234745/http://www.audi.de/content/de/brand/de/vor-sprung_durch_technik/content/2013/08/Audi-A8-erstrahlt-in-neuem-Licht.html (accessed Aug. 5, 2019) and www.all-electronics.de/matrix-led-und-laser-licht-bietet-viele-vorteile/(accessed Aug. 2, 2019). In the embodiment shown in FIG. 14, the illumination pattern L5 includes flared areas L51, dimmed areas L52, and curve light L53.

Figure 15:
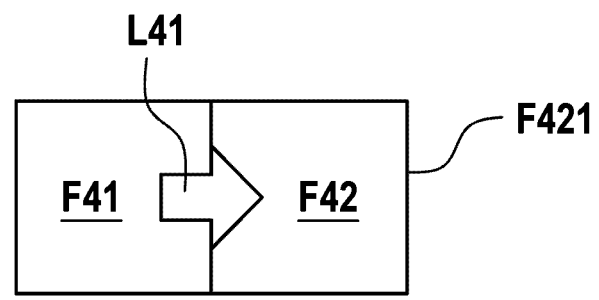
FIG. 15 shows an embodiment of an illumination device of a vehicle headlight according to FIG. 12.

FIG. 15 shows an embodiment for the illumination device F4, wherein this comprises a light source arrangement F41 with a plurality of individually adjustable areas or pixels. For example, up to 100 pixels, up to 1000 pixels, or not less than 1000 pixels may be provided, which in the sense are individually controllable by means of the controller F3 such that they can be individually switched on or off, for example. It may be provided that the illumination device F4 further comprises an attachment optics F42 for generating an illumination pattern (such as L4) at the light emitting surface F421 in accordance with the correspondingly controlled areas or pixels of the light source arrangement F41 or in accordance with the light L41 irradiated into the attachment optics F42.

Matrix headlights within the meaning of the present disclosure may also be matrix SSL HD headlights. Examples of such headlights are shown in the Internet link www.springerprofessional.de/fahrzeug-lichttechnik/fahrzeugsicherheit/hella-bringt-neues-ssl-hd-matrix-licht-system-auf-den-markt/17182758 (accessed May 28, 2020), the Internet link www.highlight-web.de/5874/hella-ssl-hd/ (accessed May 28, 2020), and the Internet link www.hella-.com/techworld/de/Lounge/Unser-Digital-Light-SSL-HD- Lichtsystem-ein-neuer-Meilenstein-der-automobilen-Lichttechnik-55548/(accessed May 28, 2020).

Figure 16:
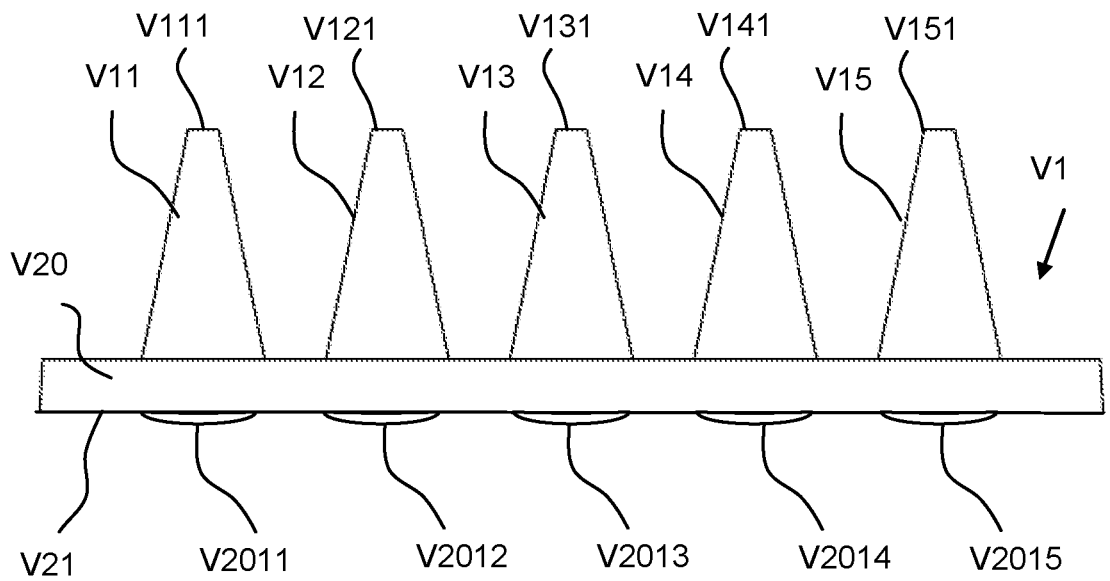
FIG. 16 shows an embodiment of an attachment optics array in a side view.
Figure 17:
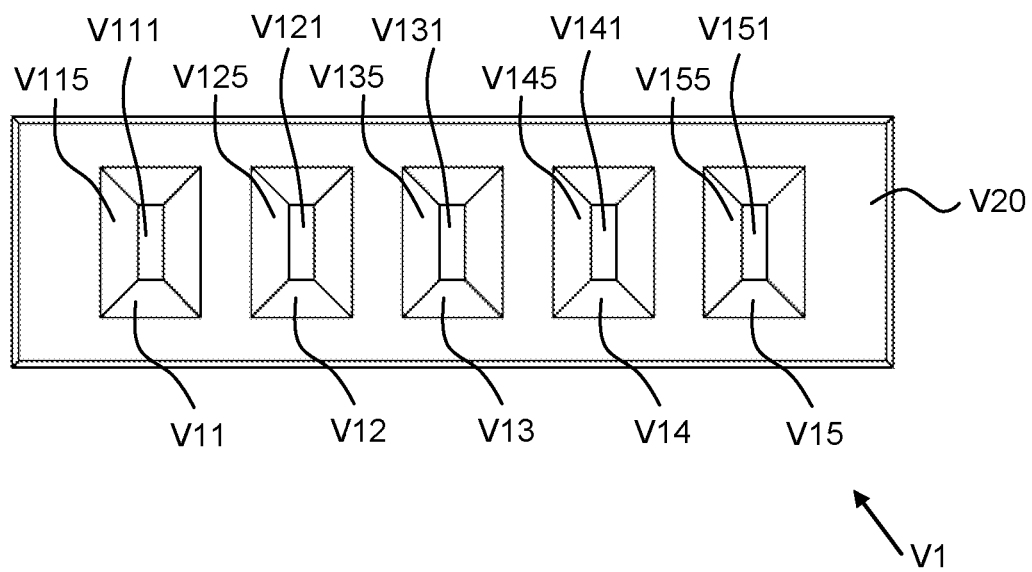
FIG. 17 shows the attachment optics array of FIG. 16 in a top view and, FIG. 18 shows the use of an attachment optics array according to FIG. 16 and FIG. 17 in a motor vehicle headlight usable in a motor vehicle according to FIG. 10.

FIG. 16 shows a one-piece attachment optics array V1 in a side view. FIG. 17 shows the attachment optics array V1 in a top view from behind. The attachment optics array V1 includes a base part V20 having lenses V2011, V2012, V2013, V2014, and V2015 attached thereto and on which an attachment optics V11 having a light entrance area V111, an attachment optics V12 having a light entrance area 121, an attachment optics V13 having a light entrance area V131, an attachment optics V14 having a light entrance area V141, and an attachment optics V15 having a light entrance area V151 is formed. The side areas V115, V125, V135, V145, V155 of the attachment optics V11, V12, V13, V14, V15 are configured in such a way that light entering the respective light entrance area V111, V121, V131, V141 or V151 is subject to total internal reflection (TIR) so that this light emerges from the base part V20 or the surface V21 of the base part V20, which forms the common light exit surface of the attachment optics V11, V12, V13, V14 and V15. The rounding radii between the light entrance areas V111, V121, V131, V141 and V151 at the transition to the side areas V115, V125, V135, V145 and V155 are, for example, 0.16 to 0.2 mm.

Figure 18:
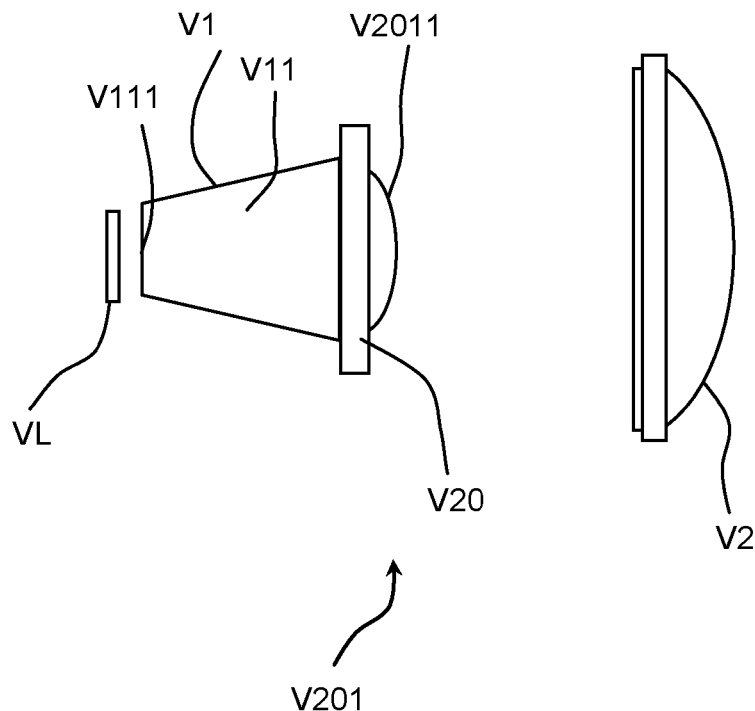

FIG. 18 shows a vehicle headlight V201 or motor vehicle headlight—which can be used instead of the vehicle headlight S1—in a principle illustration. The vehicle headlight V201 comprises a light source arrangement VL, for example comprising LEDs, for irradiating light into the light entrance area V111 of the attachment optics V11 or the light entrance areas V112, V113, V114 and V115, not shown in greater detail, of the attachment optics V12, V13, V14 and V15. In addition, the vehicle headlight V201 comprises a secondary lens V2 produced according to a method mentioned above for imaging the light exit surface of the attachment optics V11 or the surface V21 of the attachment optics array V1, which is not shown in more detail. The attachment optics array V1 is preferably made of glass, but may be made of plastic for certain applications. If the attachment optics array is made of plastic, it is particularly envisaged that the lenses V2011, V2012, V2013, V2014 and V2015 are formed in the final step with a layer thickness of less than 1 mm, for example less than 0.75 mm, for example less than 0.5 mm.

Figure 19:
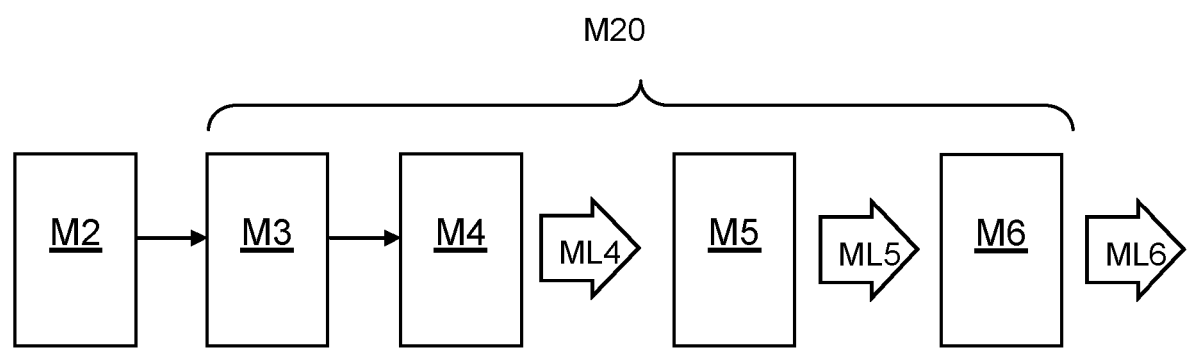
FIG. 19 shows another embodiment of an alternative motor vehicle headlight for use in the motor vehicle shown in FIG. 10.

Another suitable area of use for optical elements or lenses manufactured according to the disclosure is disclosed, for example, in DE 10 2017 105 888 A1 or the headlight described with reference to FIG. 19 for use instead of the vehicle headlight S1. Thereby, FIG. 19 exemplarily shows a light module (headlight) M20 comprising a light emitting unit M4 with a plurality of point-shaped light sources arranged in a matrix-like manner, each emitting light ML4 (with a Lambertian radiation characteristic), and further comprising a concave lens M5 and a projection optics M6. In the example shown in DE 10 2017 105 888 A1 according to FIG. 19, the projection optics M6 comprises two lenses arranged one behind the other in the beam path, which have been produced according to a method corresponding to the aforementioned method. The projection optics M6 reproduces the light ML4 emitted by the light emitting unit M4 and, after passing through the concave lens M5, further shaped light ML5 as a resulting light distribution ML6 of the light module M20 on the roadway in front of the motor vehicle S100 in which the light module M20 or the headlight is (have been) installed.

The light module M20 has a controller, designated by reference character M3, which controls the light emitting unit M4 as a function of the values of a sensor system or environmental sensors M2 of the motor vehicle S100. The concave lens M5 has a concavely curved exit surface on the side facing away from the light emitting unit M4. The exit surface of the concave lens M5 redirects light ML4 irradiated into the concave lens M5 by the light emitting unit M4 with a large irradiation angle toward the edge of the concave lens by means of total reflection, so that it does not pass through the projection optics M6. According to DE 10 2017 105 888 A1, light beams emitted at a 'large beam angle' by the light emitting unit M4 are those light beams which (without arrangement of the concave lens M5 in the beam path) would be poorly imaged, for example blurred, on the roadway by means of the projection optics M6 due to optical aberrations and/or which could lead to stray light which reduces the contrast of the image on the roadway (see also DE 10 2017 105 888 A1). It may be provided that the projection optics M6 can only sharply image light with an aperture angle limited to approximately +/−20°. Light beams with aperture angles greater than +/−20°, for example greater than +/−30°, are thus prevented from hitting the projection optics M6 by the arrangement of the concave lens M5 in the beam path.

The light emitting unit M4 can be designed differently. According to one embodiment, the individual point-shaped light sources of the light emitting unit M4 each comprise a semiconductor light source, for example a light emitting diode (LED). The LEDs can be selectively controlled individually or in groups to switch the semiconductor light sources on or off or to dim them. For example, the light module M20 has more than 1,000 individually controllable LEDs. For example, the light module M20 can be designed as a so-called pAFS (micro-structured adaptive front-lighting system) light module.

According to an alternative possibility, the light emitting unit M4 comprises a semiconductor light source and a DLP or micromirror array comprising a plurality of micromirrors that can be individually controlled and tilted, each of the micromirrors forming one of the point light sources of the light emitting unit M4. For example, the micromirror array comprises at least 1 million micromirrors that can be tilted, for example, at a frequency of up to 5,000 Hz.

Figure 20:
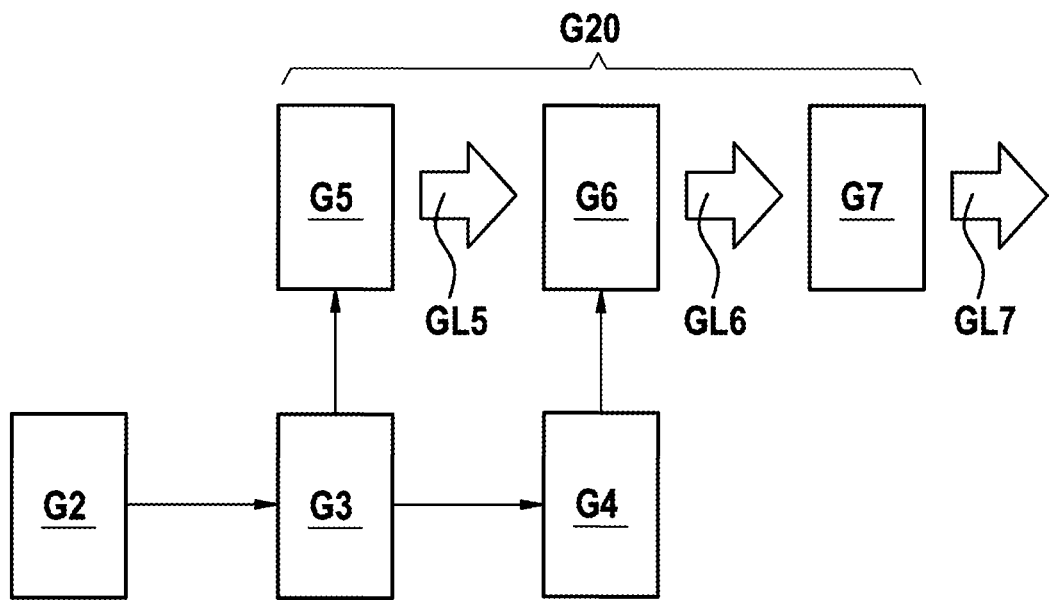
FIG. 20 shows another embodiment of an alternative motor vehicle headlight for use in the motor vehicle shown in FIG. 10.
Figure 21:
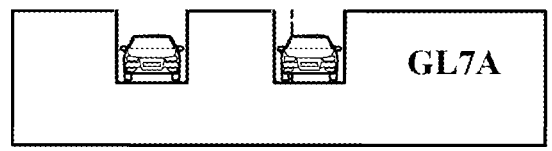
FIG. 21 shows an example of illumination using the motor vehicle headlight shown in FIG. 20.

Another example of a headlight system or light module (DLP system) is disclosed by the Internet link www.al-lighting.com/news/article/digital-light-millions-of-pixels-on-the-road/(accessed Apr. 13, 2020). A schematically represented corresponding headlight module or vehicle headlight for generating an illumination pattern designated GL7A in FIG. 21 is shown in FIG. 20. The adaptive headlight G20 schematically shown in FIG. 20—which can be used instead of the vehicle headlight S1—is used for situation- or traffic-dependent illumination of the surroundings or the roadway in front of the motor vehicle S100 as a function of environmental sensors G2 of the motor vehicle S100. Light GL5 generated by the illumination device G5 is formed into an illumination pattern GL6 by means of a system of micromirrors G6, as also shown, for example, in DE 10 2017 105 888 A1, which in turn radiates light GL7 suitable for adaptive illumination in front of the motor vehicle S100 or in an environment on the roadway in front of the motor vehicle S100 by means of a projection optical system G7 comprising optical elements produced in accordance with the aforementioned method. A suitable system G6 of movable micromirrors is disclosed by Internet link Internet link www.al-lighting.com/news/article/digital-light-millions-of-pixels-on-the-road/(accessed Apr. 13, 2020).

A controller G4 is provided for controlling the system G6 with movable micromirrors. In addition, the headlight G20 includes a controller G3 both for synchronization with the controller G4 and for controlling the illumination device G5 in response to environmental sensors G2. Details of the controllers G3 and G4 can be obtained from the Internet link www.al-lighting.com/news/article/digital-light-millions-of-pixels-on-the-road/(accessed Apr. 13, 2020). The illumination device G5 may comprise, for example, an LED arrangement or a comparable light source arrangement, an optical system such as a field lens (which, for example, has also been produced according to the described method), and a reflector.

Figure 22:
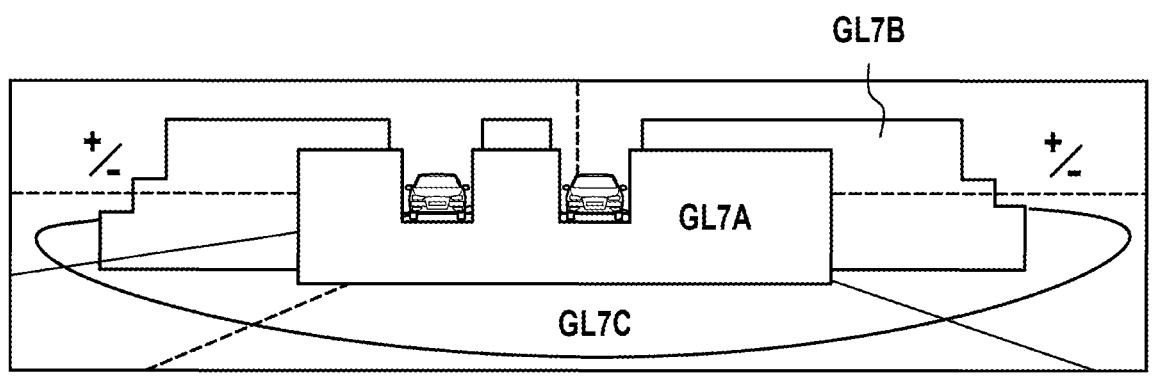
FIG. 22 shows an example of superimposed illumination using the illumination according to FIG. 21 and the illumination of two other headlight systems or subsystems.

The vehicle headlight G20 described with reference to FIG. 20 can be used for example in conjunction with other headlight modules or headlights to achieve a superimposed overall light profile or illumination pattern. This is shown by way of example in FIG. 22, where the overall lighting pattern is composed of the GL7A lighting pattern, GL7B and the GL7C. For example, it can be provided that the illumination pattern GL7C is generated by means of the headlight S1 and the illumination pattern GL7B is generated by means of the headlight V201.

Figure 23:
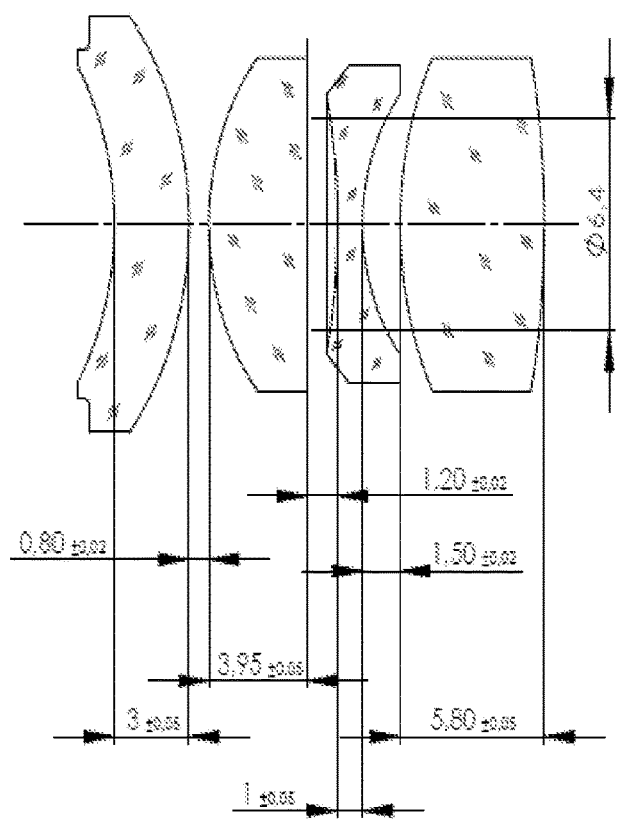
FIG. 23 shows an embodiment of an objective.
Figure 24:
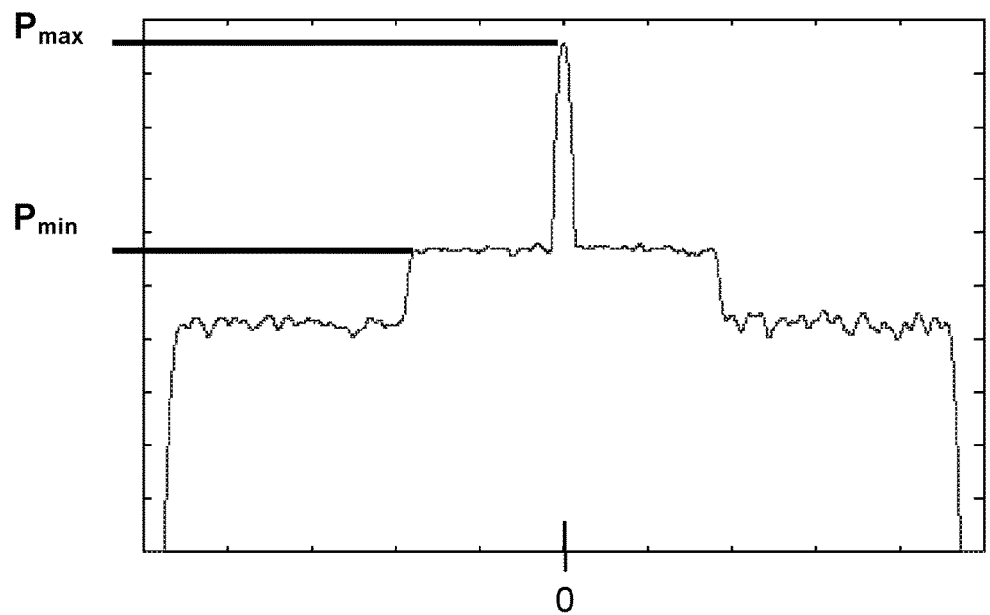
FIG. 24 shows light power logarithmically plotted versus distance from a considered point of an object.

Sensor systems for the aforementioned headlights comprise for example a camera and an evaluation or pattern recognition system for evaluating a signal supplied by the camera. A camera comprises for example an objective or multi-lens objective and an image sensor for imaging an image generated by the objective on the image sensor. In a suitable manner, an objective such as that disclosed in U.S. Pat. No. 8,212,689 B2 (incorporated by reference in its entirety) and shown by way of example in FIG. 23 is used. Such a lens is suitable because of the avoidance or considerable reduction of reflected images, since by means of such an objective it is possible, for example, to avoid confusion of a reflected image of an oncoming vehicle with light with a vehicle ahead with light. A suitable objective, for example for infrared light and/or visible light, images an object in an image plane, wherein, with respect to the imaging of an object, for each point within the image circle of the objective or for at least one point within the image circle of the objective, Pdyn 70 dB, for example Pdyn 80 dB, for example Pdyn 90 dB, where Pdyn as illustrated in FIG. 24 clarified is equal to 10·log(Pmax/Pmn), where Pmax is the maximum light power of a point in the image plane for imaging a point of the object, and where Pmin is the light power of another point in the image plane for imaging the point of the object, whose light power with respect to imaging the point of the object is greater than the light power of any further point in the image plane with respect to imaging the point of the object, or where Pmin is the maximum light power of the reflected image signals of the point of the object imaged in a further point. The lenses or a part of the lenses of the objective shown in FIG. 23 may be manufactured according to the claimed or disclosed method, it being provided for example that the correspondingly produced lenses have a circumferential or partially circumferential edge in deviation from the representation in FIG. 23.

Figure 25:
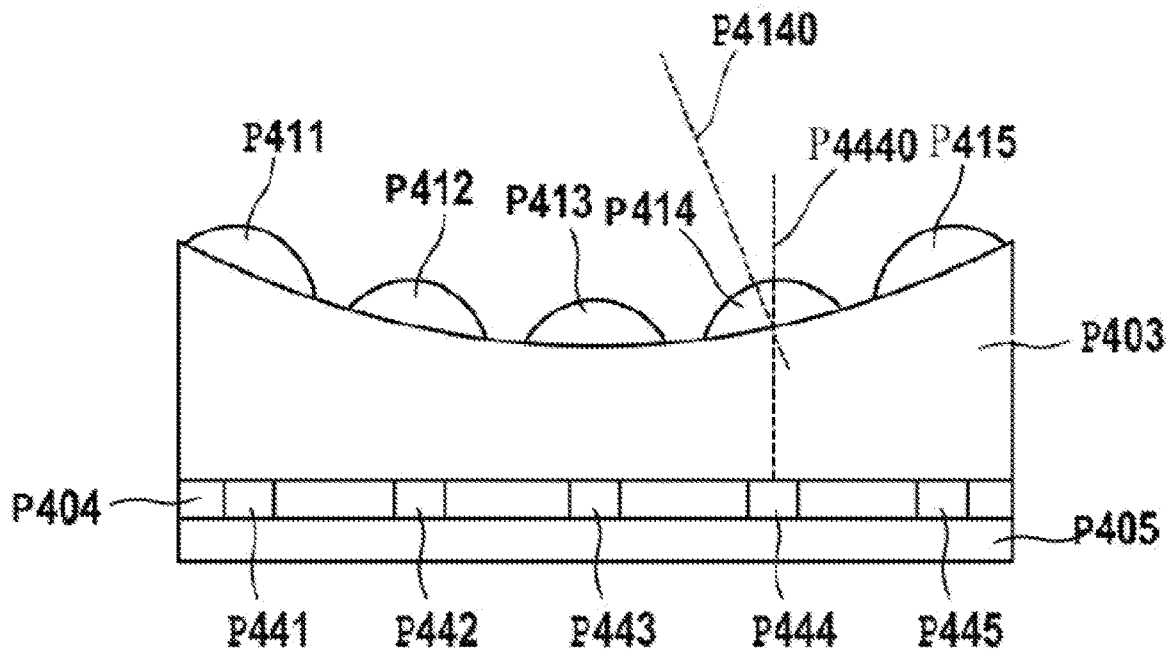
FIG. 25 shows a projection display with a microlens array having a (concave) curved base.
Figure 26:
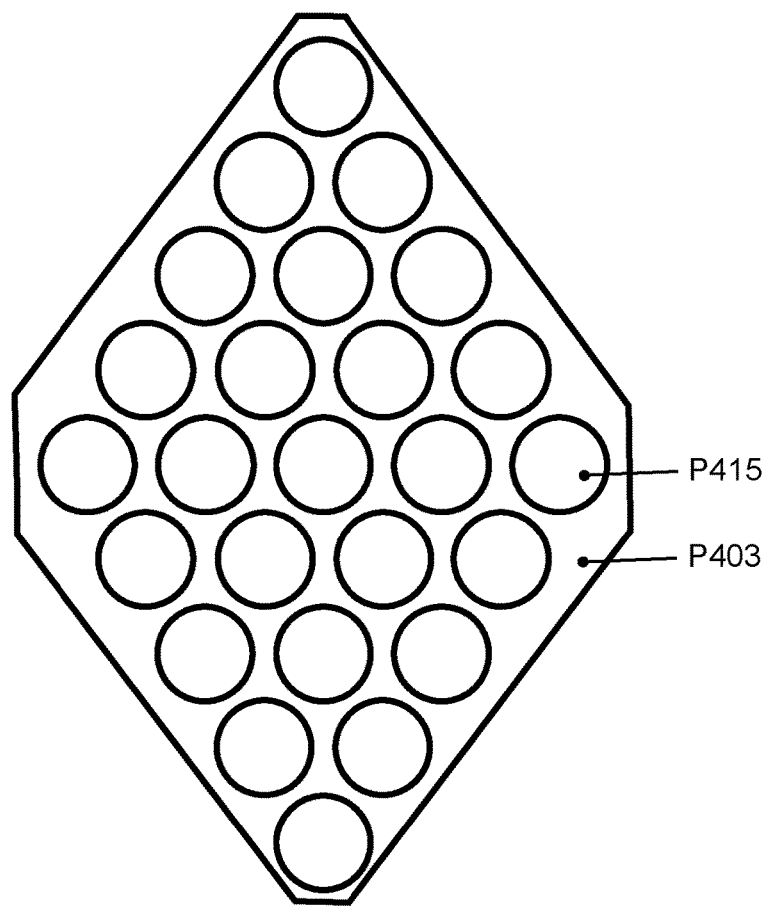
FIG. 26 shows a top view of the projection display according to FIG. 25.

Another example of the use of the method described below is the production of micro-lens arrays, such as microlens arrays as shown in FIG. 4 and FIG. 5 of WO 2014/131426 A1, and/or for example microlens arrays for projection displays. Such a microlens array or its use in a projection display is shown in FIG. 25. FIG. 26 shows the microlens array in a top view. Such microlens arrays or projection displays are described, for example, in WO 2019/072324 A1, DE 10 2009 024 894 A1, DE 10 2011 076 083 A1 and DE 10 2020 107 072 A1. The microlens array according to FIG. 25 is a one-piece injection molded part that integrally combines the substrate or carrier P403 and the projection lenses P411, P412, P413, P414, P415. Moreover, the projection lenses P411, P412, P413, P414, P415 are arranged following a concave contour or a parabolic contour with respect to each other. Due to this arrangement, for example, the optical axis P4140 of the projection lenses such as projection lens P414 is tilted with respect to the orthogonal P4440 of the object structure P444 (see below). On one of the sides of the carrier P403 facing away from the projection lenses P411, P412, P413, P414, P415, a metal mask P404 is arranged, this having recesses in which object structures P441, P442, P443, P444 and P445 are arranged. An illumination layer P405 is arranged above the object structures. It may also be provided that the illumination layer P405 comprises a transparent electrode, a light-emitting layer, and a reflective back electrode. Furthermore, a light source such as disclosed in U.S. Pat. No. 8,998,435 B2 may be considered as an alternative illumination means.

Figure 27A:
FIG. 27A shows liquid plastic for forming a pre-preform in an injection mold.
Figure 27B:
FIG. 27B shows an embodiment of a pre-preform.
Figure 27C:
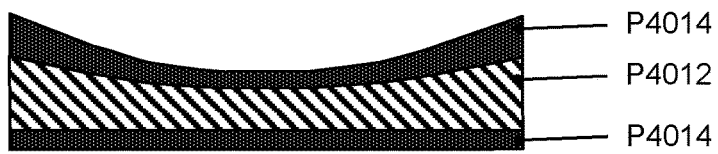
FIG. 27C shows an embodiment of a pre-preform and liquid plastic in an injection mold for forming a preform.
Figure 27D:
FIG. 27D shows an embodiment of a preform after curing of the plastic according to FIG. 27C
Figure 27E:
FIG. 27E shows an embodiment of a preform with liquid plastic in an injection mold.
Figure 27F:
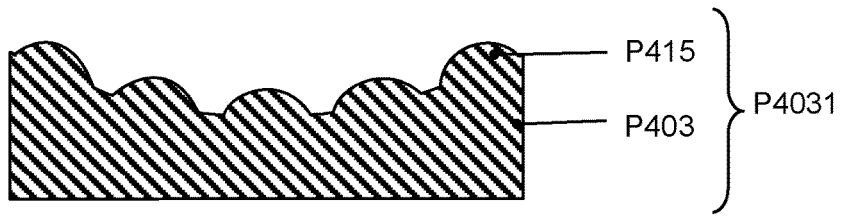
FIG. 27F shows an embodiment of the plastic shown in FIG. 27E after curing, showing a cross-section of a microlens array for a projection display.
Figure 28A:
FIG. 28A shows liquid plastic for forming a pre-preform in an injection mold.
Figure 28B:
FIG. 28B shows an embodiment of a pre-preform.
Figure 28C:
FIG. 28C shows an embodiment of a pre-preform and liquid plastic in an injection mold for forming a preform
Figure 28D:
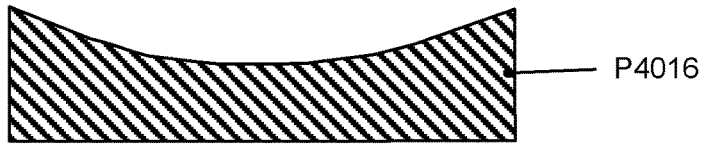
FIG. 28D shows an embodiment of a preform after curing of the plastic according to FIG. 28C
Figure 28E:
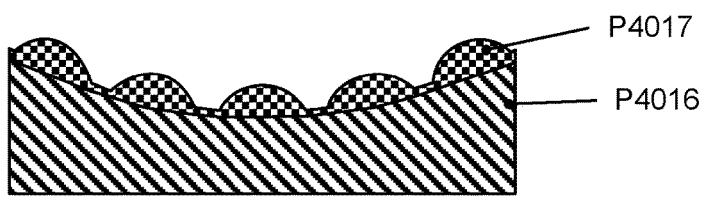
FIG. 28E shows an embodiment of a preform with liquid plastic in an injection mold.
Figure 28F:
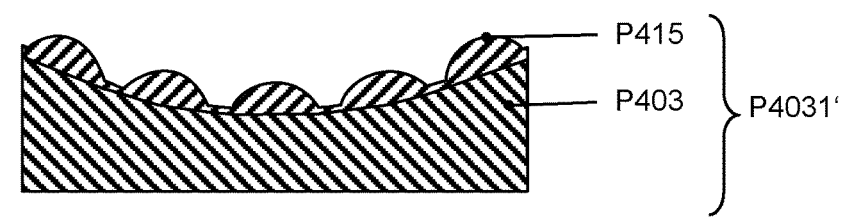
FIG. 28F shows an embodiment of the plastic shown in FIG. 28E after curing, showing a cross-section of a microlens array for a projection display.

FIG. 27A to FIG. 27F and FIG. 28A to FIG. 28F each show an embodiment example for manufacturing a microlens array for a projection display according to FIG. 25. FIG. 27A shows liquid plastic P4014 for molding a pre-preform P4012 shown in FIG. 27B in a cavity of an injection mold not shown. FIG. 27C shows an embodiment of pre-preform P4012 and liquid plastic P4014 in a cavity of an injection mold not shown for molding a preform P4016 shown in FIG. 27D after curing plastic P4014. FIG. 27E shows an embodiment of the preform P4016 with liquid plastic P4014 in a cavity of an injection mold not shown. FIG. 27F shows the microlens array P4031 after curing of plastic P4014. The process steps shown in FIG. 28A to FIG. 28D correspond to the process steps shown in FIG. 27A to FIG. 27D. FIG. 28E shows an embodiment of preform P4016 with liquid plastic P4017 in a cavity of an injection mold not shown, where reference signs P4016 and P4017 denote different plastics. FIG. 28F shows a microlens array P4031' usable instead of microlens array P4031 after curing of plastic P4017. For example, it is provided that the plastic P4017 is and/or comprises a semi-polymer, a silicone, a polysiloxane and/or a siloxane.

The elements or objects in FIG. 1, FIG. 2A, FIG. 2B, FIG. 2C, FIG. 2D, FIG. 4, FIG. 5, FIG. 8, FIG. 9, FIG. 11, FIG. 12, FIG. 15, FIG. 16, FIG. 17, FIG. 18, FIG. 19, FIG. 20, FIG. 21, FIG. 22, FIG. 25, FIG. 26, FIG. 27A, FIG. 27B, FIG. 27C, FIG. 27D, FIG. 27E, FIG. 27F, FIG. 28A, FIG. 28B, FIG. 28C, FIG. 28D, FIG. 28E, and FIG. 28F are drawn with simplicity and clarity in mind and not necessarily to scale. For example, the scales of some elements are exaggerated relative to other elements to enhance understanding of embodiments of the present disclosure.

The disclosure specifies for example an improved manufacturing process for optical elements. Thereby, it is desirable to achieve a particularly high contour accuracy and/or surface quality for optical elements and/or lenses and/or headlight lenses. In addition, it is desirable to reduce the costs of a producing process for lenses and/or headlights, microprojectors or vehicle headlights.

LIST OF REFERENCE SIGNS

S100 motor vehicle
S1 vehicle headlight
S2 headlight lens
S3 lens body
S4 convex curved surface
S5a surface facing a light source
S6 edge S10 light source
S12 reflector
S14 shield
S15 edge of a shield
20 pre-molded part
21 sprue
22, 23 preform
30 injection-molded part
31 additional sprue
32, 33 plastic as injection molding material/injection pressing material for over-molding a pre-molded part
41 sprue
42, 43 optical element (automotive lens element)
50, 50' injection molding unit
51 heating system
52 snail
53 material feed
54 liquefied plastic
60, 60' injection tool
61, 62, 61', 62' partial form
71 ejector
72 cooling channels
80, 80', 80" hot runner system
81 hot runner nozzle
111, 112, 113, 114,
115, 116, 117, 118 step
200, 200' pre-molded part
201, 201' sprue
202, 202', 203, 203' preform
204, 204' injection point
420, 430 lens body
421, 431 edge of an automotive lens element
441, 442, 443, 444 blind processes
500, 500' injection molding machine
P1, P1', P2, P2', P3 injection molding machine (injection press)
K1, K1', K2 cooling
SP1, SP1', SP2 storage
HDG bright-dark boundary
F2 environmental sensors
F3 controller
F4 illumination device
F5 objective
F20, V201 vehicle headlight
F41 light source arrangement
F42 attachment optics
F421 light exit area of F4
L4 light
L41 light irradiated in F42
L5 lighting pattern
L51 flared areas
L52 dimmed areas
L53 curve light
V1 attachment optics array
V2 optics, secondary lens
V11, V12, V13, V14, V15 attachment optics
V20 base part
V21 surface from V20
V111, V121, V131,
V141, V151 light entrance area
V115, V125, V135,
V145, V155 side areas
V2011, V2012, V2013,
V2014, V2015 lenses
VL light source arrangement
M2 environmental sensors
M3 controller
M4 light emitting unit
ML4 light
M5 concave lens
ML5 further formed light
M6 projection optics
ML6 resulting light distribution
M20 light module
G20 headlight
G2 environmental sensors
G3 controller
G4 controller
G5 illumination device
GL5 light generated by GL5
G6 system of micromirrors
GL6 lighting pattern
G7 projection optics
GL7 light
$P_{max}$, $P_{min}$ light power
HDG bright-dark boundary
P403 carrier
P411, P412, P413,
P414, P415 projection lens
P4140 optical axis
P4440 orthogonal
P404 metal mask
P441, P442, P443,
P444, P445 object structures
P405 lighting module
P4014, P4017 liquid plastic
P4012 pre-preform
P4016 preform
P4031, P4031" Micro-Lens-Array

The invention claimed is:

1. A method of producing an optical lens element having at least one optically effective light exit surface and having at least one optically effective light entrance surface, the method comprising:
   providing a first injection mold;
   providing a second injection mold;
   liquefying a transparent plastic;
   injecting the liquefied transparent plastic into the first injection mold to form a pre-molded part comprising a sprue, a first preform, and a second preform, wherein the first preform and the second preform are connected via the sprue;
   cooling the pre-molded part outside the first injection mold;
   placing the pre-molded part in the second injection mold; and
   injecting the liquefied transparent plastic into the second injection mold which over-molds the first preform and the second preform to form a first optical lens element and a second optical lens element, respectively, wherein the first optical lens element comprises a first layer that comprises a first optically effective light exit surface and the second optical lens element comprises a second layer that comprises a second optically effective light exit surface, wherein at least 70% of the first layer and at least 70% of the second layer are not thicker than 1 mm;
   separating the sprue from the first optical lens element; and
   separating the sprue from the second optical lens element.

2. The method according to claim 1, wherein the first optical element is a projection lens.

3. The method according to claim 2, wherein the second lens optical element is a projection lens.

4. The method according to claim 3, wherein at least 90% of the first layer is not thicker than 1 mm.

5. The method according to claim 4, wherein at least 90% of the second layer is not thicker than 1 mm.

6. The method according to claim 1, wherein the maximum deviation of the actual value from the target value of the distance between the first optically effective light exit surface of the first optical lens element and an optically effective light entrance surface of the first optical lens element is not greater than 40 μm.

7. The method according to claim 6, wherein the maximum deviation of the actual value from the target value of the distance between the second optically effective light exit surface of the second optical lens element and an optically effective light entrance surface of the second optical lens element is not greater than 40 μm.

8. The method of producing an optical lens element having at least one optically effective light exit surface and having at least one optically effective light entrance surface, the method comprising:
providing a first injection mold;
providing a second injection mold;
liquefying a transparent plastic;
injecting the liquefied transparent plastic via a hotrunner into the first injection mold to form a pre-molded part comprising a sprue, a first preform, and a second preform, wherein the first preform and the second preform are connected via the sprue;
cooling the pre-molded part outside the first injection mold;
placing the pre-molded part in the second injection mold;
injecting the liquefied transparent plastic into the second injection mold, via the hotrunner, which over-molds the first preform and the second preform to form a first optical lens element and a second optical lens element, respectively, wherein the first optical lens element comprises a first layer that comprises a first optically effective light entrance surface and the second optical lens element comprises a second layer that comprises a second optically effective light entrance surface, wherein at least 80% of the first layer and at least 80% of the second layer are not thicker than 1 mm;
separating the sprue from the first optical lens element; and
separating the sprue from the second optical lens element.

9. The method according to claim 8, wherein the layer is not thicker than 1 mm.

10. The method according to claim 8, wherein the maximum deviation of the actual value from the target value of the distance between an optically effective light exit surface of the first optical lens element and the first optically effective light entrance surface of the first optical lens element is not greater than 40 μm.

11. The method according to claim 10, wherein the maximum deviation of the actual value from the target value of the distance between an optically effective light exit surface of the second optical lens element and the second optically effective light entrance surface of the second optical lens element is not greater than 40 μm.

12. A method of producing an optical lens element having at least a first optically effective surface and at least a second optically effective surface, the method comprising:
providing a first injection mold;
providing a second injection mold;
providing a third injection mold;
liquefying a transparent plastic;
injecting the liquefied transparent plastic into the first injection mold to form a pre-preform;
cooling the pre-preform outside the first injection mold;
placing the pre-preform in the second injection mold;
injecting the liquefied transparent plastic into the second injection mold which over-molds the pre-preform to form a preform that comprises a first layer comprising the first optically effective surface, wherein at least 80% of the first layer is not thicker than 1 mm;
cooling the preform outside the second injection mold;
placing the preform in the third injection mold; and
injecting the liquefied transparent plastic into the third injection mold which over-molds the preform to form the optical lens element that comprises a second layer comprising the second optically effective surface, wherein at least 80% of the second layer is not thicker than 1 mm.

13. The method according to claim 12, wherein the first layer is an optically effective light exit surface and wherein the second layer is an optically effective light entrance surface.

14. The method according to claim 12, wherein the first layer is an optically effective light entrance surface and wherein the second layer is an optically effective light exit surface.

15. The method according to claim 12, wherein the first layer is not thicker than 1 mm.

16. The method according to claim 12, wherein the second layer is not thicker than 1 mm.

17. The method according to claim 13, wherein the maximum deviation of the actual value from the target value of the distance between the optically effective light exit surface and the optically effective light entrance surface of the optical element is not greater than 40 μm.

18. The method according to claim 14, wherein the maximum deviation of the actual value from the target value of the distance between the optically effective light exit surface and the optically effective light entrance surface of the optical element is not greater than 40 μm.

19. The method according to claim 12, wherein the pre-preform is connected to a sprue, and the method further comprising separating the sprue from the optical element.

* * * * *